US011474598B2

(12) United States Patent
Mulpuri et al.

(10) Patent No.: US 11,474,598 B2
(45) Date of Patent: Oct. 18, 2022

(54) SYSTEMS AND METHODS FOR GAZE PREDICTION ON TOUCH-ENABLED DEVICES USING TOUCH INTERACTIONS

(71) Applicants: Vijaya Krishna Mulpuri, Aurora (CA); Qiang Xu, Richmond Hill (CA); Wei Li, Markham (CA); Chenhe Li, Markham (CA); Xiaoliang Li, Toronto (CA)

(72) Inventors: Vijaya Krishna Mulpuri, Aurora (CA); Qiang Xu, Richmond Hill (CA); Wei Li, Markham (CA); Chenhe Li, Markham (CA); Xiaoliang Li, Toronto (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 4 days.

(21) Appl. No.: 17/158,642

(22) Filed: Jan. 26, 2021

(65) Prior Publication Data
US 2022/0236793 A1 Jul. 28, 2022

(51) Int. Cl.
*G06F 3/01* (2006.01)
*G06F 3/041* (2006.01)
(Continued)

(52) U.S. Cl.
CPC ............ *G06F 3/013* (2013.01); *G06F 3/0416* (2013.01); *G06F 3/0488* (2013.01);
(Continued)

(58) Field of Classification Search
CPC .... G06F 3/013; G06F 3/0416; G06F 3/04815; G06F 3/0488; G06F 2203/04106;
(Continued)

(56) References Cited

U.S. PATENT DOCUMENTS

| 6,204,828 B1 * | 3/2001 | Amir ...................... G06F 3/013 345/157 |
| 10,943,388 B1 * | 3/2021 | Hosenpud ............... G06T 15/10 |

(Continued)

FOREIGN PATENT DOCUMENTS

| CN | 106909220 A | 6/2017 |
| CN | 107239222 A | 10/2017 |

(Continued)

OTHER PUBLICATIONS

K. Krafka et al., "Eye Tracking for Everyone", 2016 IEEE Conference on Computer Vision and Pattern Recognition (CVPR), Las Vegas, NV, 2016, pp. 2176-2184.
(Continued)

*Primary Examiner* — Richard J Hong

(57) ABSTRACT

Systems and method for low-power gaze prediction on touch-enabled electronic devices using touch interactions are provided. The method includes receiving an input touch interaction applied to a touch interaction area on a touchscreen display of a touch-enabled device and obtaining, by a gaze prediction module, a predicted gazing area on the touchscreen display based on the input touch interaction. A touch-enabled device has a processor, a touchscreen display and memory storing instructions to carry out the method. The gaze prediction module may utilize a model based on Bayesian inference or convolutional neural networks. Advantageously, gaze prediction is achieved without the use of image-capturing devices and with low power consumption. This can be used to develop intelligent hands-free interactions and personalized recommendation systems.

16 Claims, 27 Drawing Sheets

(51) Int. Cl.
  *G06F 3/0488* (2022.01)
  *G06N 3/08* (2006.01)
  *G06F 3/04815* (2022.01)

(52) U.S. Cl.
  CPC ............ *G06F 3/04815* (2013.01); *G06N 3/08* (2013.01); *G06F 2203/04106* (2013.01)

(58) Field of Classification Search
  CPC ...... G06F 1/1686; G06F 3/0485; G06F 3/014; G06F 40/103; G06F 3/011; G06N 3/08; G06T 15/10; G09G 5/00; G06K 9/6267; B60R 1/00
  See application file for complete search history.

(56) References Cited

U.S. PATENT DOCUMENTS

| | | | |
|---|---|---|---|
| 2005/0209749 A1* | 9/2005 | Ito | B60R 1/00 348/148 |
| 2005/0243054 A1* | 11/2005 | Beymer | G06F 3/013 382/103 |
| 2010/0273533 A1 | 10/2010 | Cho | |
| 2013/0169560 A1* | 7/2013 | Cederlund | G06F 3/014 345/173 |
| 2013/0176208 A1* | 7/2013 | Tanaka | G06F 3/013 345/156 |
| 2013/0278625 A1* | 10/2013 | Obata | G06F 3/013 345/619 |
| 2014/0002352 A1* | 1/2014 | Jacob | G09G 5/00 345/156 |
| 2014/0009395 A1* | 1/2014 | Ku | G06F 3/013 345/157 |
| 2014/0268054 A1* | 9/2014 | Olsson | G06F 1/1686 351/209 |
| 2015/0286853 A1* | 10/2015 | Shapovalova | G06K 9/6267 382/103 |
| 2015/0293886 A1* | 10/2015 | Mohanakrishnan | G06F 40/103 715/273 |
| 2016/0224111 A1 | 8/2016 | Kim | |
| 2017/0083088 A1* | 3/2017 | Lannsjö | G06F 3/0485 |
| 2017/0262168 A1 | 9/2017 | Xu | |
| 2017/0322623 A1* | 11/2017 | McKenzie | G06F 3/011 |
| 2018/0181272 A1* | 6/2018 | Olsson | G06F 3/0485 |
| 2018/0314324 A1 | 11/2018 | Abed Aljawad et al. | |
| 2020/0401218 A1* | 12/2020 | Camilleri | G06F 3/013 |

FOREIGN PATENT DOCUMENTS

| | | |
|---|---|---|
| CN | 111881763 A | 11/2020 |
| JP | H111353118 A | 12/1999 |
| JP | 2012185678 A | 9/2012 |
| WO | 2014197408 A1 | 12/2014 |
| WO | 2015065478 A1 | 5/2015 |
| WO | 2015179253 A1 | 11/2015 |
| WO | 2016145580 A1 | 9/2016 |
| WO | 2020215960 A1 | 10/2020 |

OTHER PUBLICATIONS

K. A. F. Mora et al., "EYEDIAP: A Database for the Development and Evaluation of Gaze Estimation Algorithms from RGB and RGB-D Cameras", ETRA, 2014.

Y. Sugano et al., "Learning-by-Synthesis for Appearance-based 3D Gaze Estimation", CVPR, 2014.

X. Zhang et al., "Appearance-Based Gaze Estimation in the Wild", CVPR, 2015.

C. Zhang et al., "Exploring Viewer Gazing Patterns for Touch-Based Mobile Gamecasting", IEEE Transactions on Multimedia, vol. 19, No. 10, pp. 2333-2344, Oct. 2017.

T. Hagiya et al., "Probabilistic Touchscreen Keyboard Incorporating Gaze Point Information", Proceedings of the 16th International Conference on Human-Computer Interaction with Mobile Devices & Services (MobileHCI 2014). Association for Computing Machinery, New York, NY, USA, pp. 329-333.

W. Guo et al., "Understanding Mobile Reading via Camera Based Gaze Tracking and Kinematic Touch Modeling", Proceedings of the 20th ACM International Conference on Multimodal Interaction (ICMI '18). Association for Computing Machinery, New York, NY, USA, pp. 288-297.

T. Li et al., "Ultra-Low Power Gaze Tracking for Virtual Reality", Proceedings of the 15th ACM Conference on Embedded Network Sensor Systems, SenSys'17, Nov. 6-8, 2017, pp. 1-14.

A. Mayberry et al., "iShadow: Design of a Wearable, Real-Time Mobile Gaze Tracker", Proceedings of the 12th Annual International Conference on Mobile Systems, Applications and Services, MobiSys'14, Jun. 16-19, 2014, pp. 82-94.

* cited by examiner

| Event code | X-coordinate | Y-coordinate | Pressure | Time stamp |
|---|---|---|---|---|
| 0 | 650 | 2350 | 6 | 1244 |
| 1 | 653 | 2305 | 5 | 1257 |
| 2 | 664 | 2268 | 5 | 1286 |
| 3 | 682 | 2210 | 5 | 1304 |
| 4 | 693 | 2175 | 5 | 1331 |
| 5 | 704 | 2101 | 5 | 1358 |
| 6 | 741 | 200 | 5 | 1382 |
| 7 | 770 | 1977 | 4 | 1421 |
| 8 | 220 | 800 | 6 | 3500 |
| 9 | 239 | 950 | 5 | 3522 |

Figure 4

| Event code | X-coordinate | Y-coordinate | Mapping | Time stamp |
|---|---|---|---|---|
| 0 | 650 | 2350 | 93 | 1244 |
| 1 | 653 | 2305 | 93 | 1257 |
| 2 | 664 | 2268 | 85 | 1286 |
| 3 | 682 | 2210 | 85 | 1304 |
| 4 | 693 | 2175 | 77 | 1331 |
| 5 | 704 | 2101 | 77 | 1358 |
| 6 | 741 | 2000 | 70 | 1382 |
| 7 | 770 | 1977 | 70 | 1421 |

| | | | | | | | |
|---|---|---|---|---|---|---|---|
| 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 |
| 0.00 | 0.00 | 0.01 | 0.01 | 0.01 | 0.01 | 0.01 | 0.00 |
| 0.00 | 0.01 | 0.02 | 0.02 | (0.03) | 0.02 | 0.04 | 0.01 |
| 0.00 | 0.01 | (0.02) | 0.02 | 0.02 | 0.03 | 0.04 | 0.01 |
| 0.00 | 0.02 | 0.03 | 0.03 | 0.04 | 0.07 | 0.08 | 0.07 |
| 0.00 | 0.02 | 0.03 | 0.05 | 0.06 | 0.08 | 0.09 | 0.04 |
| 0.00 | 0.01 | 0.01 | 0.06 | 0.08 | 0.09 | 0.07 | 0.03 |
| 0.00 | 0.02 | 0.05 | 0.07 | 0.08 | 0.09 | 0.07 | 0.03 |
| 0.00 | 0.02 | 0.04 | 0.06 | 0.08 | 0.09 | 0.07 | 0.03 |

Cell (i=44)

Cell (i=50)

| 0.00 | 0.00 | 0.00 | 0.00 | 0.00 | 0.00 | 0.00 | 0.00 |
|------|------|------|------|------|------|------|------|
| 0.00 | 0.00 | 0.02 | 0.02 | 0.02 | 0.02 | 0.02 | 0.00 |
| 0.00 | 0.00 | 0.04 | 0.04 | 0.04 | 0.04 | 0.02 | 0.00 |
| 0.00 | 0.00 | 0.04 | 0.07 | 0.07 | 0.04 | 0.02 | 0.00 |
| 0.00 | 0.00 | 0.04 | 0.08 | 0.08 | 0.06 | 0.02 | 0.00 |
| 0.00 | 0.00 | 0.04 | 0.06 | 0.06 | 0.04 | 0.02 | 0.00 |
| 0.00 | 0.00 | 0.04 | 0.04 | 0.02 | 0.01 | 0.01 | 0.00 |
| 0.00 | 0.00 | 0.02 | 0.02 | 0.01 | 0.00 | 0.00 | 0.00 |
| 0.00 | 0.00 | 0.01 | 0.01 | 0.01 | 0.01 | 0.00 | 0.00 |
| 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 |

— 106A
Cell (i=44)
Cell (i=50)
260
280A

| 0.03 | 0.03 | 0.03 | 0.03 | 0.01 | 0.01 | 0.00 | 0.00 |
|------|------|------|------|------|------|------|------|
| 0.07 | 0.07 | 0.07 | 0.05 | 0.03 | 0.01 | 0.00 | 0.00 |
| 0.07 | 0.09 | 0.07 | 0.05 | 0.03 | 0.01 | 0.00 | 0.00 |
| 0.07 | 0.09 | 0.07 | 0.05 | 0.03 | 0.01 | 0.00 | 0.00 |
| 0.07 | 0.09 | 0.07 | 0.05 | 0.03 | 0.01 | 0.00 | 0.00 |
| 0.07 | 0.09 | 0.07 | 0.05 | 0.03 | 0.01 | 0.00 | 0.00 |
| 0.07 | 0.08 | 0.06 | 0.04 | 0.02 | 0.01 | 0.00 | 0.00 |
| 0.05 | 0.06 | 0.04 | 0.03 | 0.02 | 0.01 | 0.00 | 0.00 |
| 0.03 | 0.03 | 0.03 | 0.02 | 0.01 | 0.01 | 0.00 | 0.00 |
| 0.01 | 0.01 | 0.01 | 0.01 | 0.01 | 0.00 | 0.00 | 0.00 |
| 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 |

280B

Cell (i=44)

Cell (i=50)

| 0.00 | 0.00 | 0.00 | 0.00 | 0.00 | 0.00 | 0.00 | 0.00 |
|------|------|------|------|------|------|------|------|
| 0.00 | 0.00 | 0.00 | 0.00 | 0.00 | 0.00 | 0.00 | 0.00 |
| 0.00 | 0.00 | 0.00 | 0.01 | 0.02 | 0.02 | 0.00 | 0.00 |
| 0.00 | 0.00 | 0.00 | 0.01 | 0.02 | 0.02 | 0.00 | 0.00 |
| 0.00 | 0.00 | 0.00 | 0.01 | 0.02 | 0.02 | 0.00 | 0.00 |
| 0.00 | 0.00 | 0.00 | 0.02 | 0.03 | 0.03 | 0.00 | 0.01 |
| 0.00 | 0.00 | 0.00 | 0.04 | 0.04 | 0.04 | 0.00 | 0.00 |
| 0.00 | 0.00 | 0.04 | 0.06 | 0.06 | 0.04 | 0.00 | 0.00 |
| 0.00 | 0.00 | 0.04 | 0.06 | 0.07 | 0.05 | 0.00 | 0.00 |
| 0.00 | 0.00 | 0.03 | 0.05 | 0.04 | 0.03 | 0.00 | 0.00 |
| 0.00 | 0.00 | 0.01 | 0.01 | 0.01 | 0.01 | 0.00 | 0.00 |
| 0.00 | 0.00 | 0.00 | 0.00 | 0.00 | 0.00 | 0.00 | 0.00 |

280B

Cell (i=50)

Cell (i=44)

| 0.01 | 0.00 | 0.01 | 0.01 | 0.01 | 0.01 | 0.01 | 0.01 |
|------|------|------|------|------|------|------|------|
| 0.01 | 0.00 | 0.00 | 0.01 | 0.01 | 0.01 | 0.01 | 0.00 |
| 0.00 | 0.00 | 0.00 | 0.01 | 0.02 | 0.02 | 0.01 | 0.00 |
| 0.00 | 0.02 | 0.00 | 0.01 | 0.02 | 0.03 | 0.02 | 0.01 |
| 0.00 | 0.01 | 0.05 | 0.06 | 0.04 | 0.02 | 0.02 | 0.01 |
| 0.00 | 0.00 | 0.05 | 0.04 | 0.03 | 0.03 | 0.02 | 0.01 |
| 0.00 | 0.00 | 0.04 | 0.05 | 0.04 | 0.04 | 0.01 | 0.01 |
| 0.01 | 0.01 | 0.04 | 0.06 | 0.06 | 0.04 | 0.01 | 0.00 |
| 0.01 | 0.01 | 0.05 | 0.06 | 0.04 | 0.05 | 0.00 | 0.00 |
| 0.01 | 0.00 | 0.03 | 0.05 | 0.04 | 0.03 | 0.00 | 0.01 |
| 0.01 | 0.01 | 0.01 | 0.01 | 0.01 | 0.01 | 0.01 | 0.01 |
| 0.00 | 0.01 | 0.01 | 0.01 | 0.01 | 0.01 | 0.01 | 0.00 |

| 0.01 | 0.00 | 0.01 | 0.01 | 0.01 | 0.01 | 0.01 | 0.01 |
|------|------|------|------|------|------|------|------|
| 0.01 | 0.00 | 0.00 | 0.01 | 0.01 | 0.01 | 0.01 | 0.00 |
| 0.00 | 0.00 | 0.00 | 0.01 | 0.02 | 0.02 | 0.01 | 0.00 |
| 0.00 | 0.02 | 0.00 | 0.01 | 0.02 | 0.03 | 0.02 | 0.01 |
| 0.00 | 0.01 | 0.05 | 0.06 | 0.04 | 0.02 | 0.02 | 0.01 |
| 0.00 | 0.00 | 0.05 | 0.04 | 0.03 | 0.03 | 0.02 | 0.01 |
| 0.00 | 0.00 | 0.04 | 0.05 | 0.04 | 0.04 | 0.01 | 0.01 |
| 0.01 | 0.01 | 0.04 | 0.06 | 0.06 | 0.04 | 0.01 | 0.00 |
| 0.01 | 0.01 | 0.05 | 0.06 | 0.04 | 0.05 | 0.00 | 0.00 |
| 0.01 | 0.01 | 0.03 | 0.05 | 0.04 | 0.03 | 0.00 | 0.01 |
| 0.01 | 0.01 | 0.01 | 0.01 | 0.01 | 0.01 | 0.01 | 0.01 |
| 0.00 | 0.01 | 0.01 | 0.01 | 0.01 | 0.01 | 0.01 | 0.00 |

Figure 19

SYSTEMS AND METHODS FOR GAZE PREDICTION ON TOUCH-ENABLED DEVICES USING TOUCH INTERACTIONS

FIELD

This disclosure relates generally to screen display of touch-enabled electronic devices, and more specifically to a system and method for gaze prediction on touch-enable devices by using touch interactions.

BACKGROUND

Gaze is the externally-observable indication of human visual attention. Gaze provides quantitative evidence about how humans process visual information and benefits various areas of scientific research such as experimental psychology, computer science, human-computer interaction (HCI).

Gaze prediction, is a process to predict the three-dimensional line of sight of a person, or simply, where a person is looking. Gaze prediction on electronic devices enables researchers to develop intelligent hands-free interactions and personalized recommendation systems by extracting one's attention/interests. Automated usability testing may be performed by monitoring the user's gaze. Personalized recommendations can be made by determining the user's interest based on a dwell area of their gaze. Additionally, HCI is improved by utilizing new hands-free object selection modalities. Furthermore, gaze is an important input modality in augmented reality (AR) and virtual reality (VR) systems.

Gaze prediction methods which utilize an image sensor such as a camera are power hungry, require customized hardware, consume significant processor cycles for image processing, or may require frequent calibration. There is a need for a gaze prediction method that overcomes at least some of the aforementioned disadvantages.

SUMMARY

The present disclosure provides for systems and methods for low-power gaze prediction on a touch-enabled device.

In one aspect, the present disclosure describes a gaze prediction method. The method includes receiving an input touch interaction applied to a touchscreen display of a touch-enabled device, and obtaining, by a gaze prediction module, a predicted gazing area on the touchscreen display based on the input touch interaction.

In another aspect, the present disclosure describes a touch-enabled device that includes a touchscreen display, a processor coupled to the touchscreen display and a non-transitory memory coupled to the processor, the non-transitory memory storing machine-executable instructions. The machine-executable instructions, when executed by the processor, cause the touch-enabled device to receive an input touch interaction applied to the touchscreen display and obtain, by a gaze prediction module, a predicted gazing area on the touchscreen display based on the input touch interaction.

In yet another aspect, the present disclosure describes a non-transitory computer-readable medium having machine-executable instructions stored thereon, the machine-executable instructions, when executed by a processor of a touch-enabled device, cause the touch-enabled device to receive an input touch interaction applied to a touchscreen display of the touch-enabled device, and obtain, by a gaze prediction module, a predicted gazing area on the touchscreen display based on the input touch interaction.

In some examples of the present disclosure, receiving the input touch interaction applied to the touchscreen display of the touch-enabled device comprises detecting, by a touchscreen driver and a touch sensing system, a plurality of input touch events based on the input touch interaction.

In some examples of the present disclosure, obtaining, by the gaze prediction module, the predicted gazing area on the touchscreen display based on the input touch interaction comprises mapping the plurality of input touch events to a plurality of virtual grid cells arranged on the touchscreen display, and predicting a gaze probability for each of the plurality of virtual grid cells based on the plurality of touch events.

In some examples of the present disclosure, the gaze prediction model predicts the gaze probability for each virtual grid cell of the plurality of virtual grid cells based on an average conditional touch event given gaze probability for that virtual grid cell, an average gaze probability for that virtual grid cell, and an average touch event probability for that virtual grid cell.

The virtual grid cells are logical grid cells defined in the gaze prediction module and are not visible on the actual display. For brevity, virtual grid cells will occasionally be referred to as just "grid cells".

In some examples of the present disclosure, the average conditional touch event given gaze probability for the virtual grid cell is determined by correlating corresponding virtual grid cells for an observed touch event probabilities table and a corresponding observed gaze probabilities table.

In some examples of the present disclosure, the observed touch event probabilities table and the corresponding observed gaze probabilities table are populated during usability sessions by detecting a user's gaze using an image sensing device and correlating the user's gaze with corresponding observed touch events.

In some examples of the present disclosure, the average gaze probability is determined during usability sessions by detecting a user's gaze using an image sensing device.

In some examples of the present disclosure, the average touch event probability for the virtual grid cell is determined during usability sessions by detecting touch events on the virtual grid cell.

In some examples of the present disclosure, the gaze prediction module utilizes a gaze prediction model based on Bayesian inference or convolutional neural networks.

In some examples of the present disclosure, the gaze prediction model is based on convolutional neural networks, and the gaze prediction model predicts the gaze probability for each virtual grid cell of the plurality of virtual grid cells based on a plurality of training touch trajectories corresponding to a plurality of touch interactions, and a plurality of average gaze probabilities corresponding to the plurality of training touch trajectories.

Advantageously, the present disclosure describes methods and systems for gaze prediction on touch-enabled devices, which are simple and efficient. The gaze prediction described is based on touch interactions on a touchscreen display without the use of any image sensing devices such as cameras. By avoiding the use of image sensing device, battery power consumption is greatly reduced. Furthermore, by averting the need to perform image processing and pattern recognition to recognize the user's eye, processing resources are saved and complex computations are reduced. The need to calibrate captured images of the user's eyes and account for difference in lighting, for example, is averted.

Gaze is predicted with a reasonable degree of accuracy based on touch interactions alone, which are obtained in real-time, and on historical data gathered during usability studies. Accordingly, gaze prediction is determined with simple computations and table look-up operations in pre-populated tables. This predicts gaze in a timely manner without the need to perform lengthy computations, as would be the case in prior art devices which require capturing video images of the eye, processing and recognizing them. Therefore, the described system and methods would be particularly advantageous in real-time applications where reducing latency is of paramount importance. The described system and methods would also be of great value in portable electronic devices, such as smartphones and tablets, which are battery operated as they avert the need to use image sensing devices to predict gaze, which would quickly deplete their batteries.

BRIEF DESCRIPTION OF THE DRAWINGS

Reference will now be made, by way of example, to the accompanying drawings which show example embodiments of the present application, and in which:

FIG. 4 depicts a table of touch events generated by at least some of the components of FIG. 3;

FIG. 11 depicts a table showing information for each of a plurality of touch events corresponding to the plurality of touch points of FIG. 9, in accordance with example embodiments;

FIG. 15A depicts touch event probabilities for all virtual grid cells of the main viewing area of a touchscreen display of a touch-enabled electronic device, in response to a first input touch interaction;

FIG. 15B depicts observed gaze probabilities for all virtual grid cells of the main viewing area of FIG. 15A, in response to the first input touch interaction;

FIG. 16A depicts touch event probabilities for all virtual grid cells of the main viewing area of a touchscreen display of a touch-enabled electronic device, in response to second input touch interaction;

FIG. 16B depicts observed gaze probabilities for all virtual grid cells of the main viewing area of FIG. 16A, in response to the second input touch interaction;

FIG. 17 depicts an average conditional touch event given gaze probability table;

FIG. 19 depicts a table of average observed gaze probabilities for all grid cells of the main viewing area the touchscreen display of a touch-enabled electronic device;

DESCRIPTION OF EXAMPLE EMBODIMENTS

Figure 1:
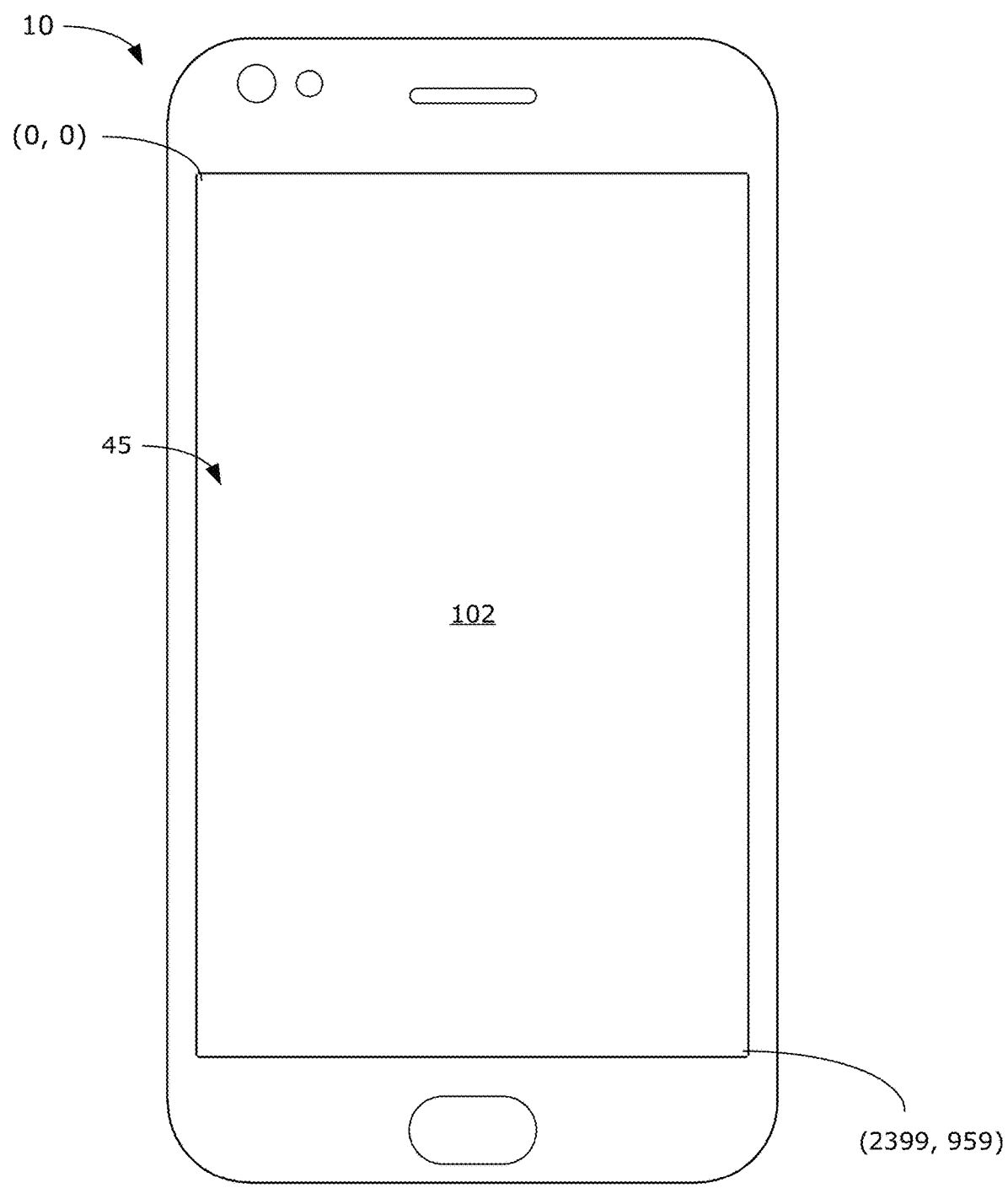
FIG. 1 depicts a touch-enabled electronic device.

Traditional gaze prediction methods are either model-based or appearance based. Model-based approaches use a geometric model of an eye and can be subdivided into corneal-reflection-based and shape-based methods. Model-based approaches tend to suffer with low image quality and variable lighting conditions. Appearance-based methods directly use eyes as input and can potentially work on low-resolution images. However, appearance-based methods are believed to require larger amounts of user-specific training data as compared to model-based methods.

The Tobii eye tracker uses corneal-reflection model-based approach of gaze prediction. The Tobii eye tracker is a small piece of hardware that attaches to the bottom of a computer display and connects to a computer via USB. It tracks a user's head and eye movements to estimate where the user is looking on the display screen. Using the user's natural gaze to complement traditional inputs (such as mouse and keyboard) provides a richer gaming immersion.

Some work has been done to implement gaze prediction (tracking) on smartphones. Mainstream solutions utilize the front camera and deep learning-based computer vision algorithms. As an example, the paper "K. Krafka et al., "Eye Tracking for Everyone," 2016 IEEE Conference on Computer Vision and Pattern Recognition (CVPR), Las Vegas, Nev., 2016, pp. 2176-2184, doi: 10.1109/CVPR.2016.239.", the contents of which are herein incorporated by reference in their entirety, describes an appearance based method for gaze prediction. A large dataset of user images were collected using a mobile phone camera and correlated with the user touching parts of the screen in response to training objects being displayed. After the dataset had been built, convolutional neural network (CNN) modelling was used to develop a model for gaze prediction using a mobile phone camera. The model was able to infer the head pose relative to the camera, and the pose of the eye relative to the head. As another example, the paper "C. Zhang, Q. He, J. Liu and Z. Wang, "Exploring Viewer Gazing Patterns for Touch-Based Mobile Gamecasting," in IEEE Transactions on Multimedia, vol. 19, no. 10, pp. 2333-2344, October 2017, doi: 10.1109/TMM.2017.2743987", the contents of which are herein incorporated by reference in their entirety, aimed at improving mobile gamecasting by predicting the gaze of the gamer. Specifically, the display was divided into tiles, and the tiles where the gamers is gazing were considered to be the tiles which have gamer's interaction. Such regions were streamed with a higher resolution and other regions were streamed with a lower resolution thus saving bandwidth and power. The method recorded the gamer's touch events and a corresponding viewer's gaze points captured by the Tobii eye tracker, to train a machine learning model. The model could estimate the expected user's gaze points based on the gamer's touch events and thus determined which regions of the display to send with high resolution based on the gamer's touch events.

Example embodiments are described herein that may in some applications mitigate the aforementioned challenges with gaze prediction. The described embodiments leverage the correlation between touch interactions and gaze while a user browses content on the touchscreen display of an electronic device, for example. In this disclosure, an electronic device employing a touchscreen display is referred to as a "touch-enabled electronic device" or simply a "touch-enabled device".

The presented systems and methods are described with reference to a touch-enabled device in the form of a smartphone. However, it would be apparent to those of skill in the art that the systems and methods are equally applicable to any touch-enabled device such as tablets computer, laptop computer with touchscreens, Surface™ computing devices, large touchscreen displays, and the like.

With reference to FIG. 1, a touch-enabled electronic device 10, such as a smartphone or a tablet computer, is shown. The touch-enabled electronic device 10 has a touchscreen display 45 including a main viewing area 102 on which content may be rendered. The shown touchscreen display 45 may have a pixel resolution of 2400 rows by 960 columns. Other display resolutions are possible.

Figure 2:
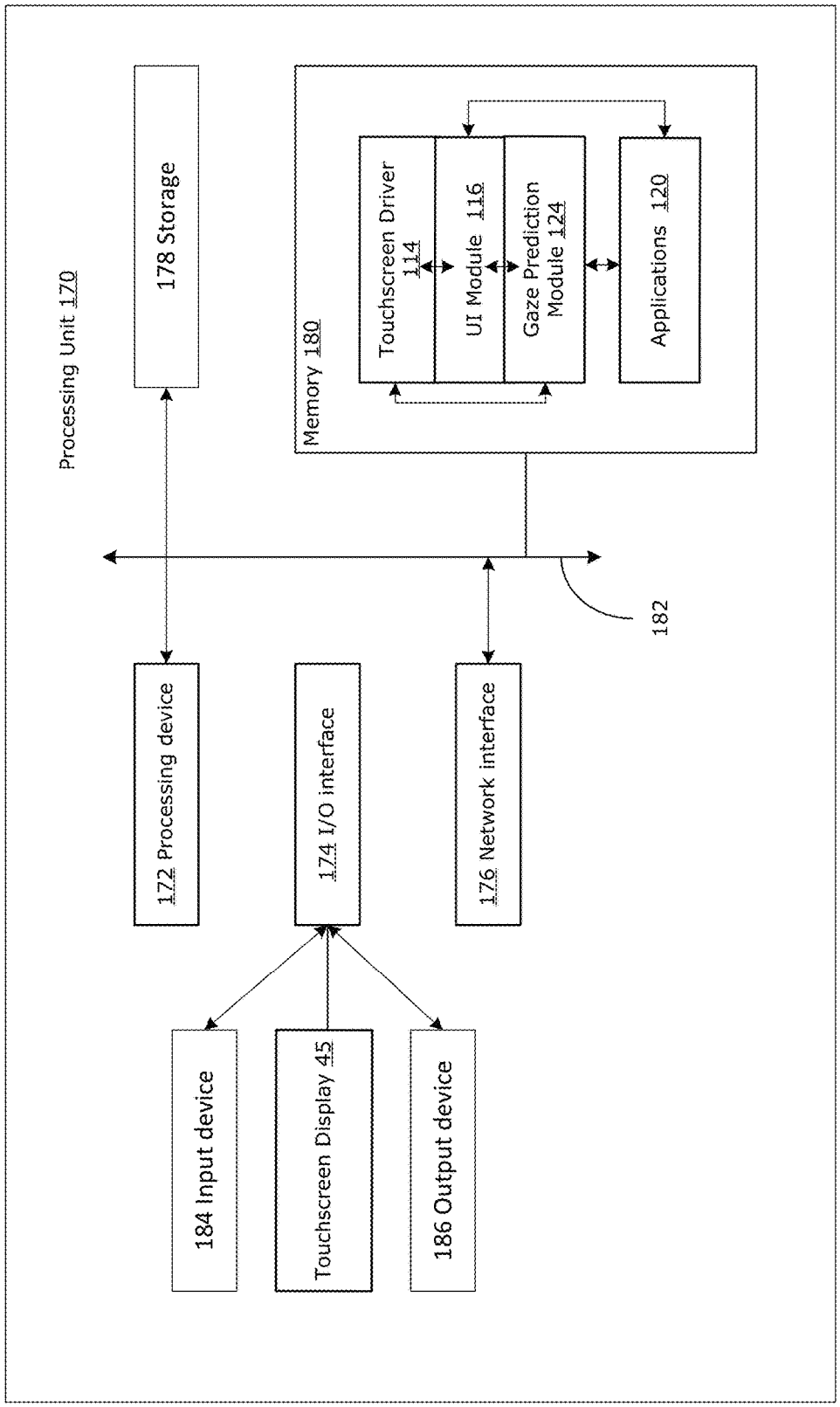
FIG. 2 is a block diagram representation of the touch-enabled electronic device of FIG. 2.

The touch-enabled electronic device 10 may be a smartphone, a tablet or any other touch-enabled electronic device. FIG. 2 is a block diagram of an example processing unit 170, which may be used to implement the touch-enabled electronic device 10. The processing unit 170 may be used to execute machine readable instructions, in order to implement methods and examples described herein. Other processing units suitable for implementing embodiments described in the present disclosure may be used, which may include components different from those discussed below. Although FIG. 2 shows a single instance of each component, there may be multiple instances of each component in the processing unit 170.

The processing unit 170 may include one or more processing devices 172, such as a processor, a microprocessor, an application-specific integrated circuit (ASIC), a field-programmable gate array (FPGA), a dedicated logic circuitry, or combinations thereof. The processing unit 170 may also include one or more input/output (I/O) interfaces 174, which may enable interfacing with one or more appropriate input devices 184 and/or output devices 186. The processing unit 170 may include one or more network interfaces 176 for wired or wireless communication with a network (e.g., an intranet, the Internet, a P2P network, a WAN and/or a LAN) or other node. The network interfaces 176 may include wired links (e.g., Ethernet cable) and/or wireless links (e.g., one or more antennas) for intra-network and/or inter-network communications.

The processing unit 170 may also include one or more storage units 178, which may include a mass storage unit such as a solid state drive, a hard disk drive, a magnetic disk drive and/or an optical disk drive. The processing unit 170 may include a memory coupled to the processor. For example, the processing unit 170 comprises one or more non-transitory memories 180 which may include a volatile (e.g. random access memory (RAM)) and non-volatile or non-transitory memories (e.g., a flash memory, magnetic storage, and/or a read-only memory (ROM)). The non-transitory memory(ies) of memories 180 store programs 113 that include machine-executable instructions for execution by the processing device(s) 172, such as to carry out examples described in the present disclosure. In example embodiments the programs 113 include machine-executable instructions for implementing operating system (OS) software 108 (which as noted above can include touchscreen driver 114, UI module 116 and gaze prediction module 124, among other OS components) and other applications 120. The gaze prediction module 124 may include machine-executable instructions for execution by the processing device 172 to carry out the gaze prediction methods described in this disclosure. In some other examples, one or more data sets and/or modules may be provided by an external memory (e.g., an external drive in wired or wireless communication with the processing unit 170) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 182 providing communication among components of the processing unit 170, including the processing device(s) 172, I/O interface(s) 174, network interface(s) 176, storage unit(s) 178 and/or memory(ies) 180. The bus 182 may be any suitable bus architecture including, for example, a memory bus, a peripheral bus or a video bus.

In FIG. 2, the input device(s) 184 include touch sensing system 112 of the touchscreen display 45, and may also include other input devices (e.g., a keyboard, a mouse, a microphone, accelerometer, and/or a keypad). Output device(s) 186 includes the display 128 of touchscreen display 45 and may also include other devices such as a speaker and a tactile generator.

Figure 3:
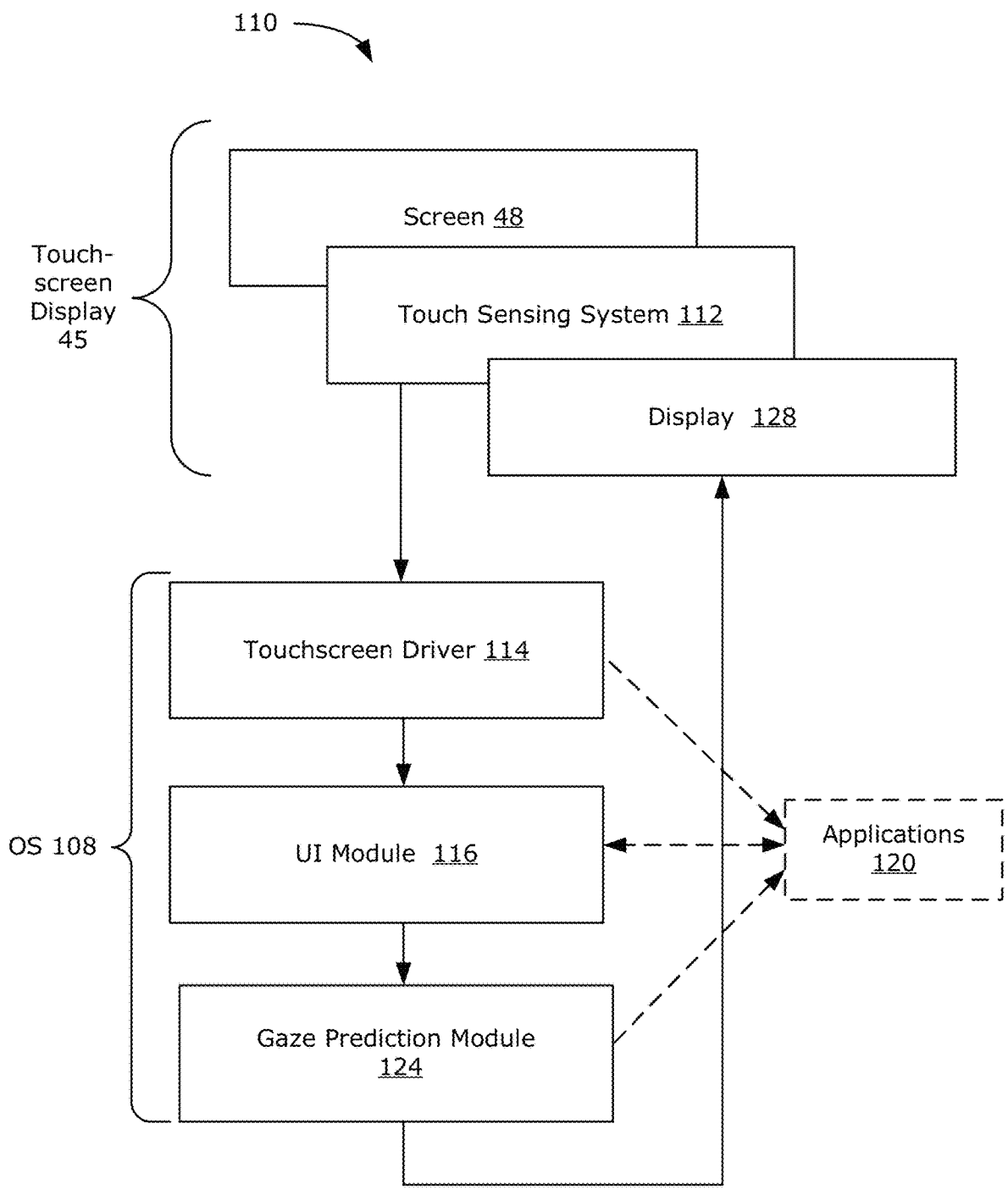
FIG. 3 is a block diagram of selected components of the touch-enabled electronic device of FIG. 2, which detect and handle touch events and touch interactions.

FIG. 3 shows selected hardware and software components of a touchscreen display system 110 of the touch-enabled electronic device 10 for detecting and processing information about touch interactions 280 of a finger or a touch input tool with the screen 48 of the touchscreen display 45. The hardware components of the touchscreen display system 110 include the touchscreen display 45, which includes a display 128, and a touch sensing system 112 for detecting input touch interactions 280 with the screen 48. Applications 120 are in communication with the gaze prediction module 124 to obtain the gaze location of the user. Different applications 120 can utilize the gaze for different purposes. For example, the regions of the main viewing area 102 corresponding to the gaze location may be displayed in a higher resolution. Additionally or alternatively, other regions of the display where the user is not gazing may be displayed in a lower resolution or updated less frequently. The applications 120 are also in communication with the UI module 116 to obtain information about the location of touch and shape of any touch interactions 280, as shown in FIG. 4.

Different technologies known in the art can be used to implement touch sensing system 112 in different example embodiments.

Figure 5:
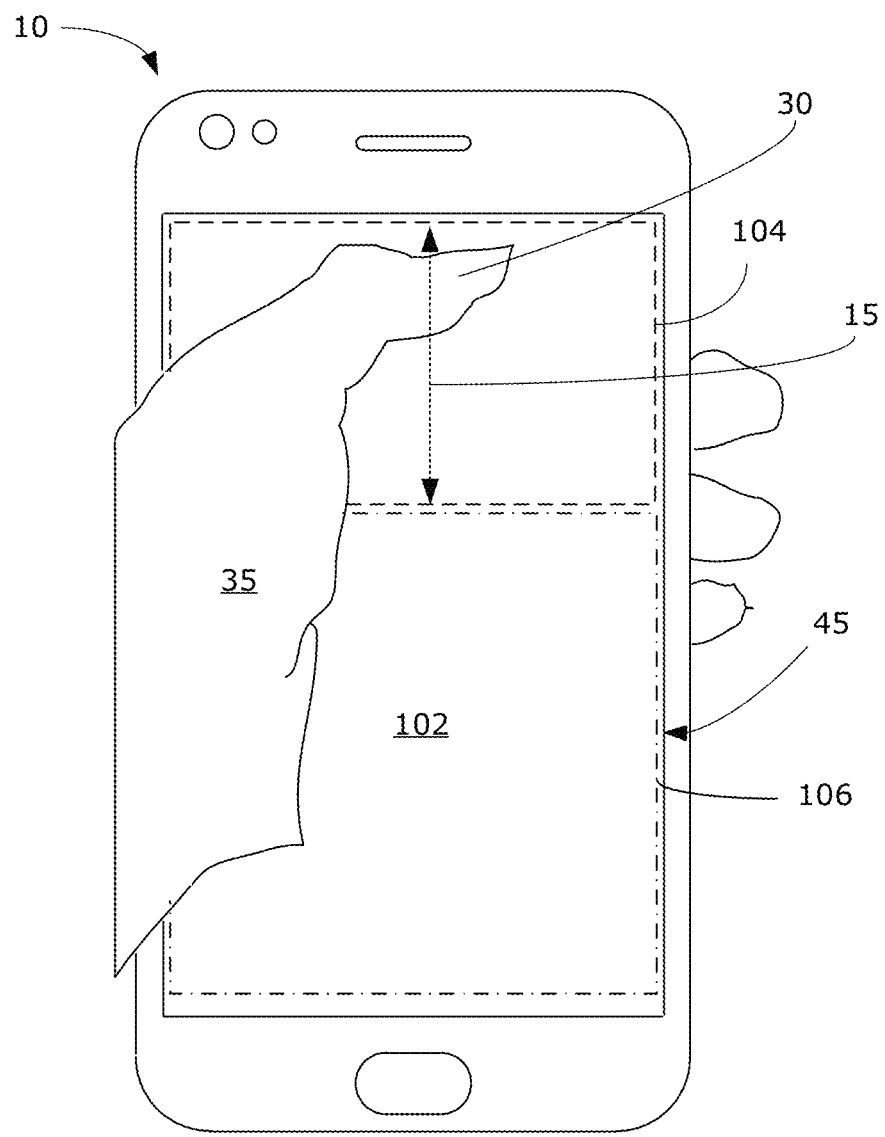
FIG. 5 depicts the touch-enabled electronic device of FIG. 1 showing a finger swipe touch interaction on a region of the touchscreen display thereof.

In one example embodiment, as shown in FIG. 5, the touchscreen display 45 is a capacitive touchscreen display such as a surface capacitive touchscreen and the touch sensing system 112 is implemented by a screen that stores an electrical charge, together with a monitoring circuit that monitors the electrical charge throughout the screen. When the capacitive screen of display 128 is touched by a conductive object that is capable of drawing a small amount of the electrical charge from the screen, the monitoring circuit generates signals indicating the point(s) of contact for the touch event.

In a further example embodiment, the touchscreen display 45 is a resistive touch screen and the touch sensing system 112 includes a screen that comprises a metallic electrically conductive coating and resistive layer, and a monitoring circuit generates signals indicating the point(s) of contact based on changes in resistance.

In a further example embodiment, the touchscreen display 45 is a SAW (surface acoustic wave) or surface wave touchscreen and the touch sensing system 112 sends ultrasonic waves and detects when the screen is touched by registering changes in the waves.

In yet further example embodiment, the touchscreen display 45 is an Infrared touch screen and the touch sensing system 112 utilizes a matrix of infrared beams that are transmitted by LEDs with a phototransistor receiving end. When an object is near the display, the infrared beam is blocked, indicating where the object is positioned.

In each of the above examples, the touch sensing system 112 generates digital signals that specify the point(s) of contact of an object with the screen of the display 128 for a touch event. These digital signals are processed by software components of the touchscreen display system 110, which in an example embodiment may be part of OS software 108 of the touch-enabled electronic device 10. For example, the OS software 108 can include a touchscreen driver 114 that is configured to convert the signals from touch sensing system 112 into touch event information. Touch event 195 contains spatial touch coordinate information that specifies a physical location of object contact point(s) on the screen of the display 128.

For example with reference to FIG. 4, touchscreen driver 114 generates touch events similar to those listed in the touch events table 190, in accordance with an example embodiment. The touch events table 190 is comprised of a plurality of rows each containing information about a touch event 195. Each touch event 195 has an event code 192, which is an incremental number. The touch event 195 also includes features such as spatial touch event x-coordinate 194 and touch event y-coordinate 196 corresponding to the location of the touch detected by the touch sensing system 112. Depending on the touch sensing system 112, the touch event 195 may also contain another feature which is an indication of the touch event pressure 197 applied to the screen 48 by a finger or a touch input tool. The touch event 195 also includes yet another feature, which is a touch event timestamp 198 indicating the time when the touch event took place. In one example, the touch event timestamp 198 may be an absolute time in the form of hours, minutes, seconds and milliseconds. In another example, the touch event timestamp 198 may be a relative time computed since to the powering up of the touch-enabled electronic device 10. In the latter example, the touch-enabled electronic device 10 is powered up at time 0 and the touch event timestamp 198 represents a measure of clock ticks, or a multiple thereof, since power-up.

In example embodiments the spatial coordinate information generated by touchscreen driver 114 is provided to a user interface (UI) module 116 of the OS software 108 that associates temporal information (e.g., start time and duration) with the spatial coordinate information for a touch event, resulting a touch coordinate information that includes spatial coordinate information and time information. In case of a touch sensing system 112 capable of providing an indication of pressure, the touchscreen driver 114 is capable of determining the pressure exerted by object contact point(s) on the screen of display 128. In this case, touch event pressure 197 may also be provided to the UI module 116. A plurality of input touch events form a touch interaction 280. The UI module 116 is configured to group a plurality of touch events into a touch interaction 280. A group of touch events 195 within a short time duration of one another form a touch interaction 280. For example, with reference to touch events table 190, the difference between the timestamp of touch events 0 to 7 is relatively small (<100). However, there is a significant temporal gap between the timestamp of touch event 7 (which has a value of 1382) and the timestamp of touch event 8 (which has a value of 3500). Accordingly, the UI module 116 concludes that events 0 through 7 form a single input touch interaction 280, whereas the touch event 8 marks the beginning of a different touch interaction.

In some embodiments, the UI module 116 is further configured to recognize a touch interaction by determining whether the touch interaction matches a touch pattern from a set of candidate touch patterns, each of which corresponds to a respective touch input action, commonly referred to as a gesture.

The gaze prediction module 124 receives touch interactions 280 from the UI module 116, the touch interactions 280 being detected on the main viewing area 102 of the touchscreen display 45. The gaze prediction module 124 processes the touch interactions 280 and uses them to predict a predicted gazing area 106 of the main viewing area 102 that the user is more likely gazing at, as will be explained below. The gaze prediction module 124 may provide the gaze prediction output, in the form of a gaze likelihood cell array 500 and a most likely gaze cell 510, to applications 120. The applications 120 may use the gaze prediction output to control their output, modify display content, determine user engagement, or any other suitable purpose.

One of the premises of gaze prediction in this disclosure is that when a user is interacting with a touchscreen display 45 with a finger or a touch input tool, there is a touch interaction area 104 of the main viewing area 102, on which the touch interaction 280 is applied. The touch interaction area 104 is obscured by the thumb finger 30 or the touch input tool (not shown) during the touch interaction 280. It is, therefore, unlikely that the user is gazing at the touch interaction area 104 during the interaction. With reference to FIG. 5, a touch-enabled electronic device 10, in the form of a smartphone, is held by a user's hand 35. The user is performing a touch interaction 280 in the form of swiping a thumb finger 30 (up or down) in the generally vertical direction indicated by the arrow 19 on the touch interaction area 104 (depicted by dashed lines). Accordingly, it is assumed that the user is gazing at a predicted gazing area 106 (depicted by dot-dash lines) which does not contain any touch interaction 280 by the user's thumb 30.

Figure 6:
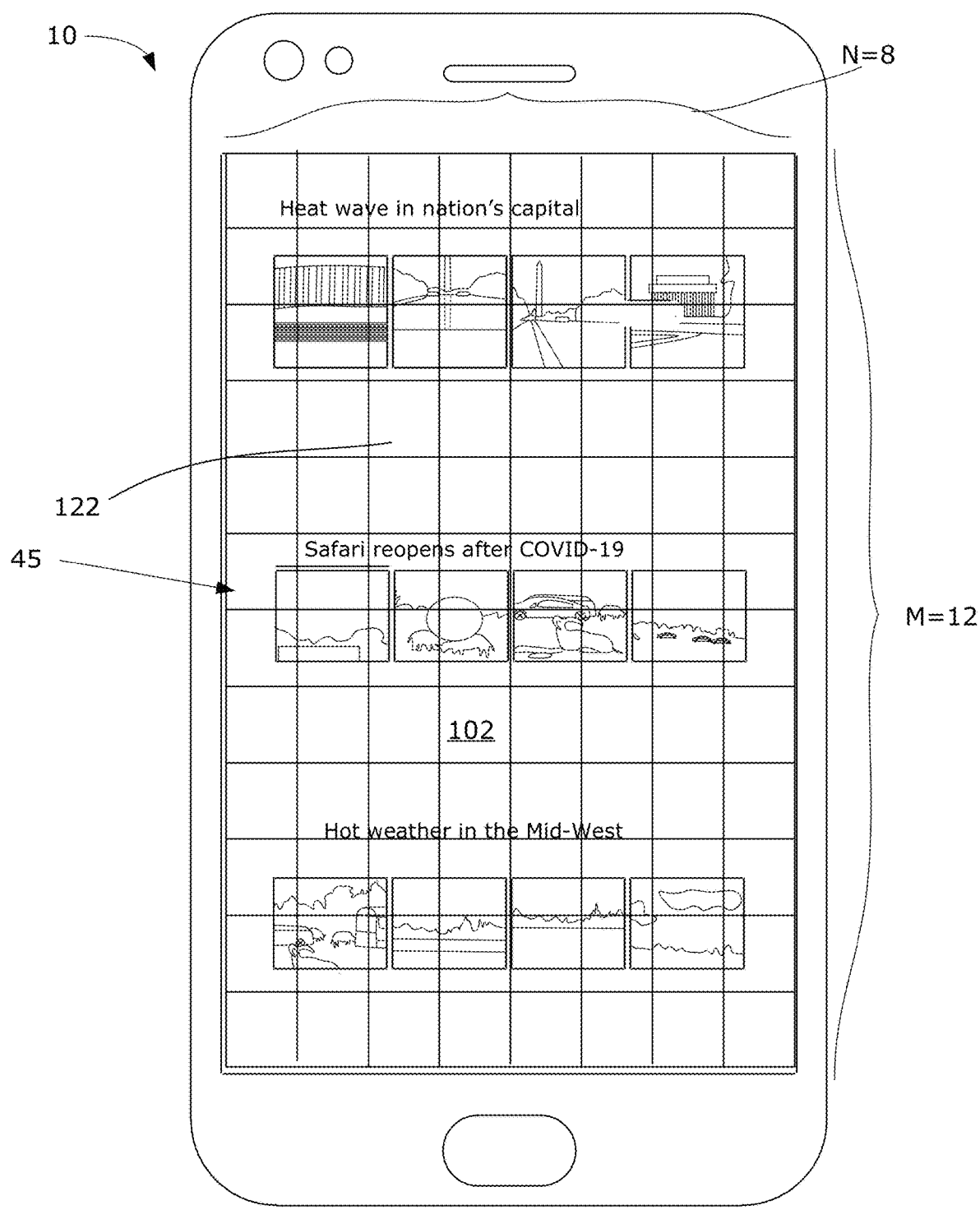
FIG. 6 depicts a touch-enabled electronic device similar to the touch-enabled electronic device of FIG. 1, wherein the main viewing area of the touchscreen display is divided into a plurality of virtual grid cells.
Figure 7A:
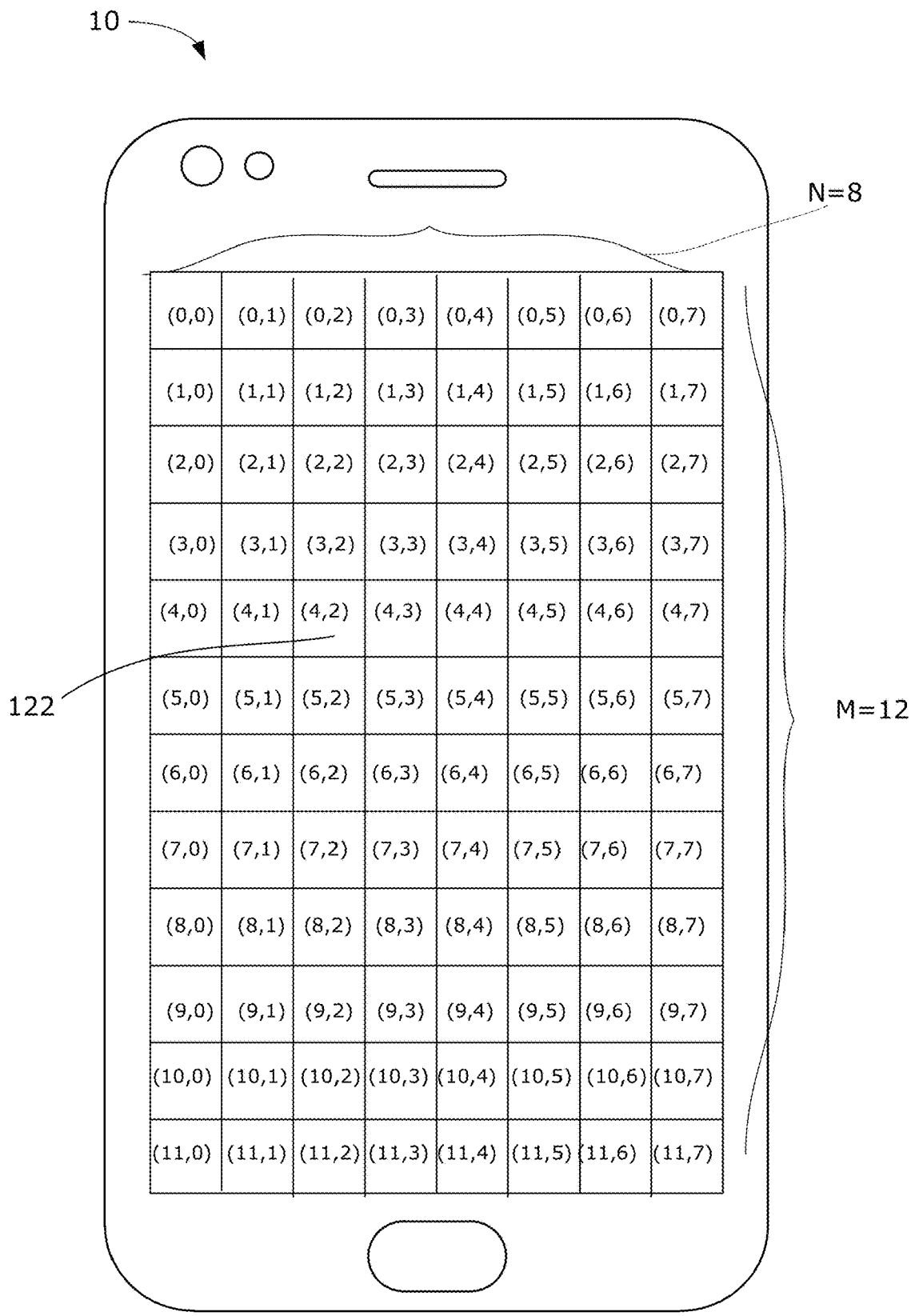
FIG. 7A depicts a touch-enabled electronic device similar to the touch-enabled electronic device of FIG. 6, with the row and column of each virtual grid cell of the plurality of virtual grid cells indicated therein.
Figure 7B:
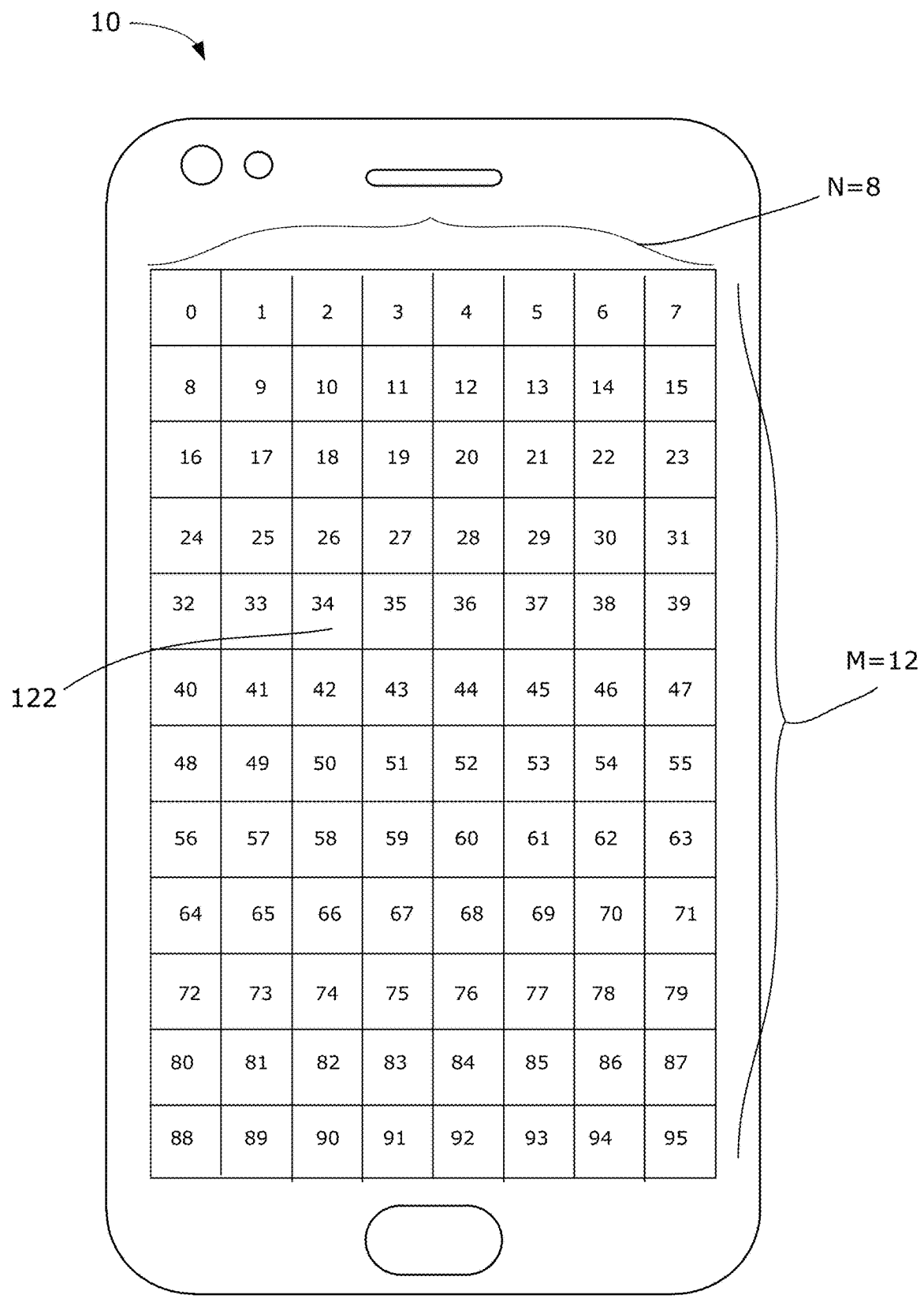
FIG. 7B depicts a touch-enabled electronic device similar to the touch-enabled electronic device of FIG. 6, with the number of each virtual grid cell of the plurality of virtual grid cells indicated therein.

For gaze prediction, pinpoint or pixel-level accuracy is not necessary for most applications. It is generally sufficient to estimate gaze location with cell granularity on a grid pattern. Accordingly, with reference to FIG. 6, the main viewing area 102 of a touchscreen display 45 of a touch-enabled electronic device 10 is partitioned into a plurality of virtual grid cells, such as grid cells 122. The virtual grid cells are logical grid cells defined in the gaze prediction module and are not visible on the actual display. For brevity, virtual grid cells will be referred to as just "grid cells". As shown in the figure, the main viewing area 102 is divided into M rows and N columns. Accordingly, there are a total of M*N grid cells, for example square grid cells. Each grid cell 122 is therefore identified by its row and column numbers. For example, with reference to FIG. 7A, each grid cell 122 is shown identified by its row and column numbers in parentheses. For example, the shown touchscreen display 45 has its main viewing area 102 divided into 10 rows and 8 columns for a total of 80 grid cells 122. The top left grid cell 122 is identified as cell (0, 0) while the bottom right grid cell is identified as grid cell (11, 7), and so on. It is more convenient to give each grid cell a single number (i). In this case a cell (i) is denoted by (row*N)+(column). For example, the grid cell (2, 3) is at row 2 and column 3. Therefore cell (2, 3) is cell number (2*8)+3=19. So the grid cell (2, 3) is cell number 19. FIG. 7B shows each grid cell 122 identified by its number (i) calculated using the aforementioned formula. For the rest of the disclosure we refer to grid cell (i) and it is understood that the grid cell number (i) depends on its row and column within the grid of grid cells 122, as well as on the number of columns (N) in the grid of grid cells.

Figure 8:
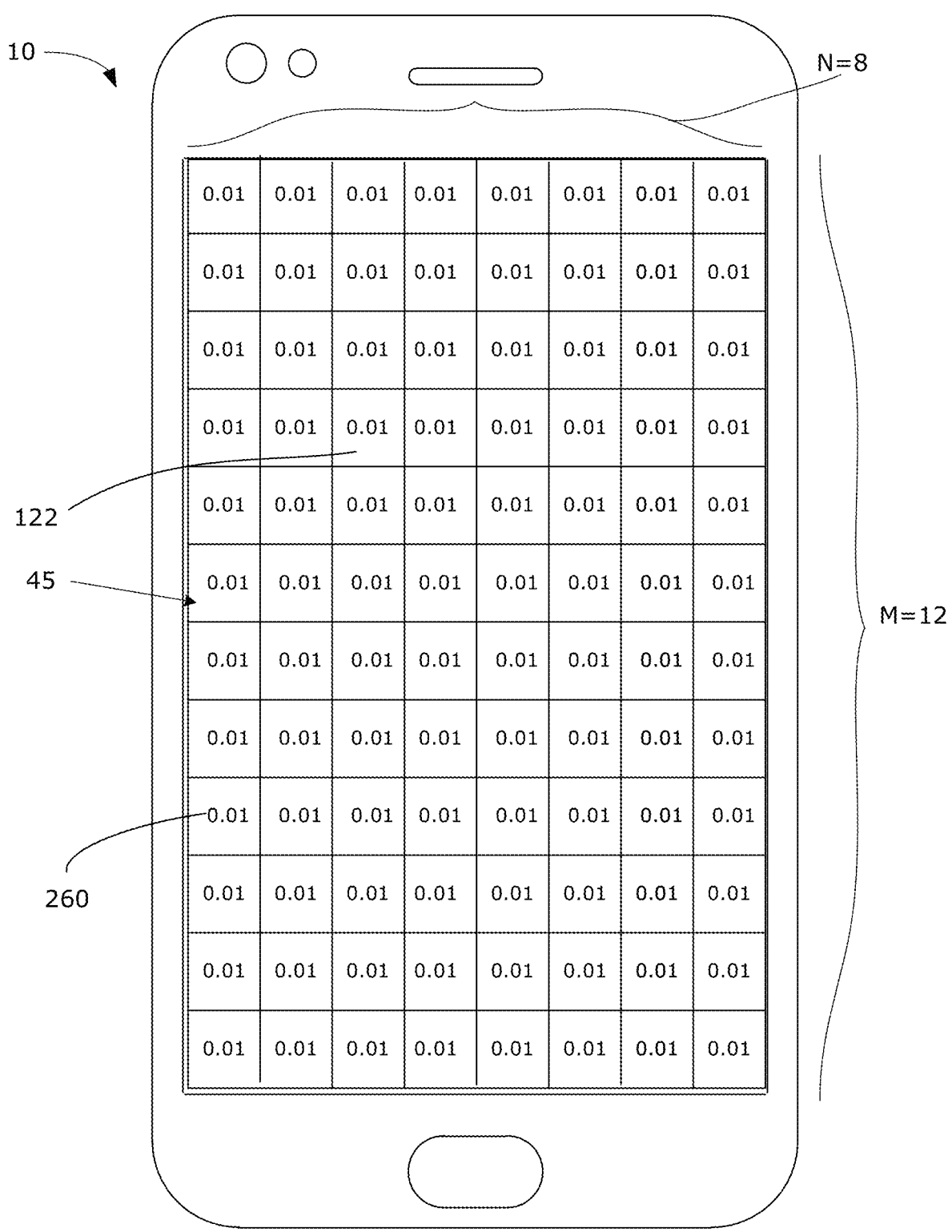
FIG. 8 depicts a touch-enabled electronic device similar to the touch-enabled electronic device of FIG. 7, wherein the default probability of a user gazing at each virtual grid cell of the plurality of virtual grid cells is indicated in that cell.

The methods presented herein utilize the premise that the probability of a user gazing on a predicted gazing area 106 is correlated with the user performing a touch interaction 280 with a touch interaction area 104. Absent any interaction between the user and the screen 48 of the touchscreen display 45, the gaze prediction probability 260 is equally likely across all cells, as shown in FIG. 8. In other words, the user may be gazing at any grid cell 122. The probability of gaze 260 in the absence of any touch interaction 280 is termed the "default probability of gaze" or "gaze default probability". The default probability of gaze on a cell (i) of M*N cells is 1/M*N. Since there are 12 rows and 8 columns of grid cells 122, there is a total of 96 cells. The probability of the user gazing at any grid cell 122 is 1/(12*8) or approximately 0.01 as shown in the figure.

Figure 9:
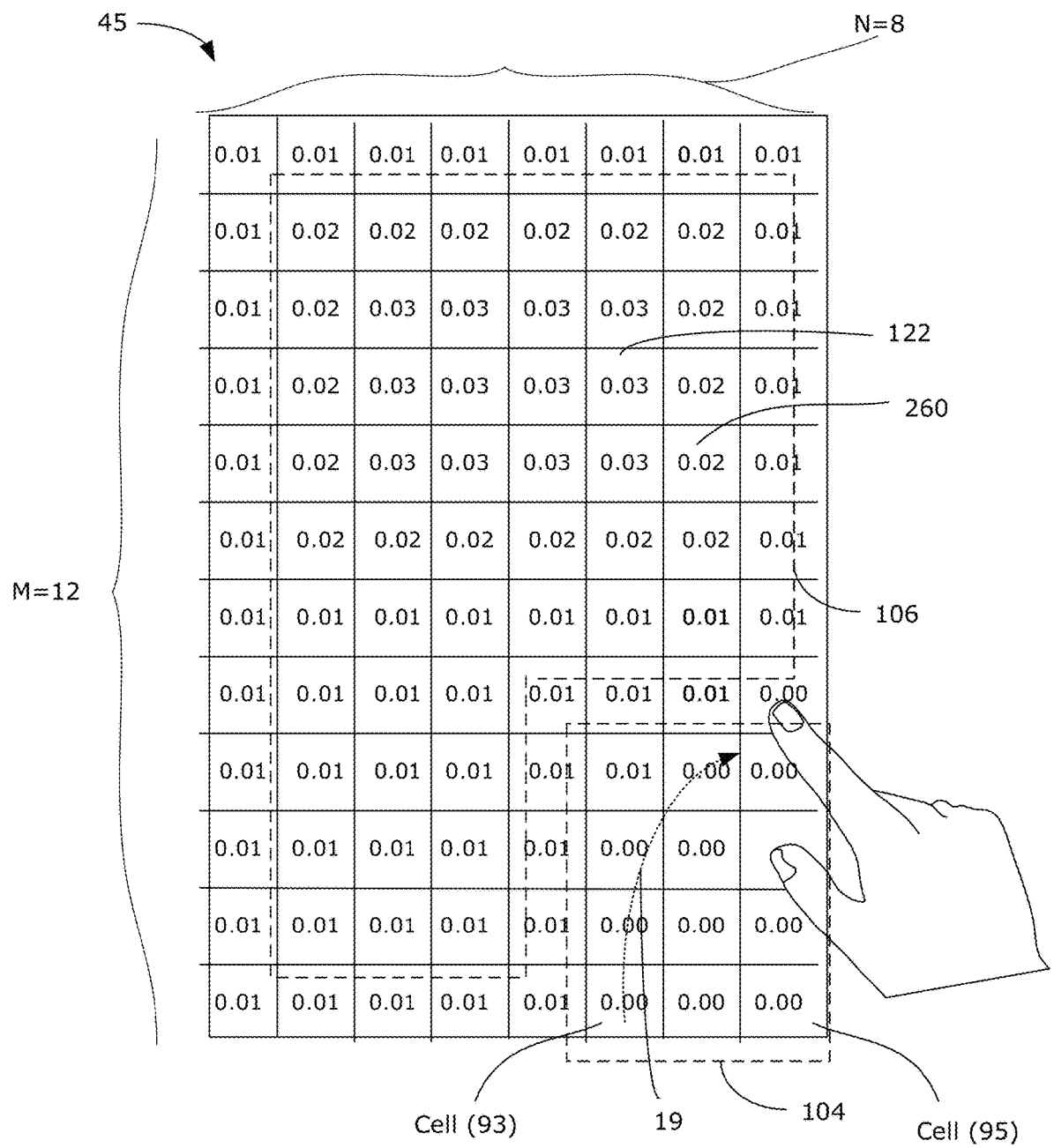
FIG. 9 depicts the touch-enabled electronic device of FIG. 8, wherein a swipe by a user finger on a region of the viewing area of the touchscreen display causes the probability associated with some of the virtual grid cells to change, in accordance with example embodiments.

As discussed earlier, when the user performs a touch interaction 280 with a touch interaction area 104, the probability of the user gazing at a predicted gazing area 106 is higher. This is shown with reference to FIGS. 9 and 10. The user swipes an index finger 32, in the direction indicated by the arrow 19, across a number of grid cells 122 in a touch interaction area 104 of the main viewing area 102 of the touchscreen display 45. A number of touch events 195 indicated as touch events E0-E7 are generated by the touch sensing system 112 in cooperation with the touchscreen driver 114 as explained above. The resulting touch events 195 correspond to events 0 to 7 in the touch events table 190 of FIG. 4. Each touch event 195 includes the X and Y spatial touch event coordinates (194, 196), optionally a touch event pressure 197, as well as the touch event timestamp 198, as discussed above. A group of touch events 195 having touch event timestamps with small temporal differences with one another form a touch interaction 280 as discussed earlier. For example, with reference to the touch event table 190, there is a significant temporal gap between the timestamp of touch event 7 (which has a value of 1382) and the timestamp of touch event 8 (which has a value of 3500). Accordingly, the UI module 116 concludes that events 0 through 7 form a single input touch interaction 280, whereas the touch event 8 marks the beginning of a different interaction.

Figure 10:
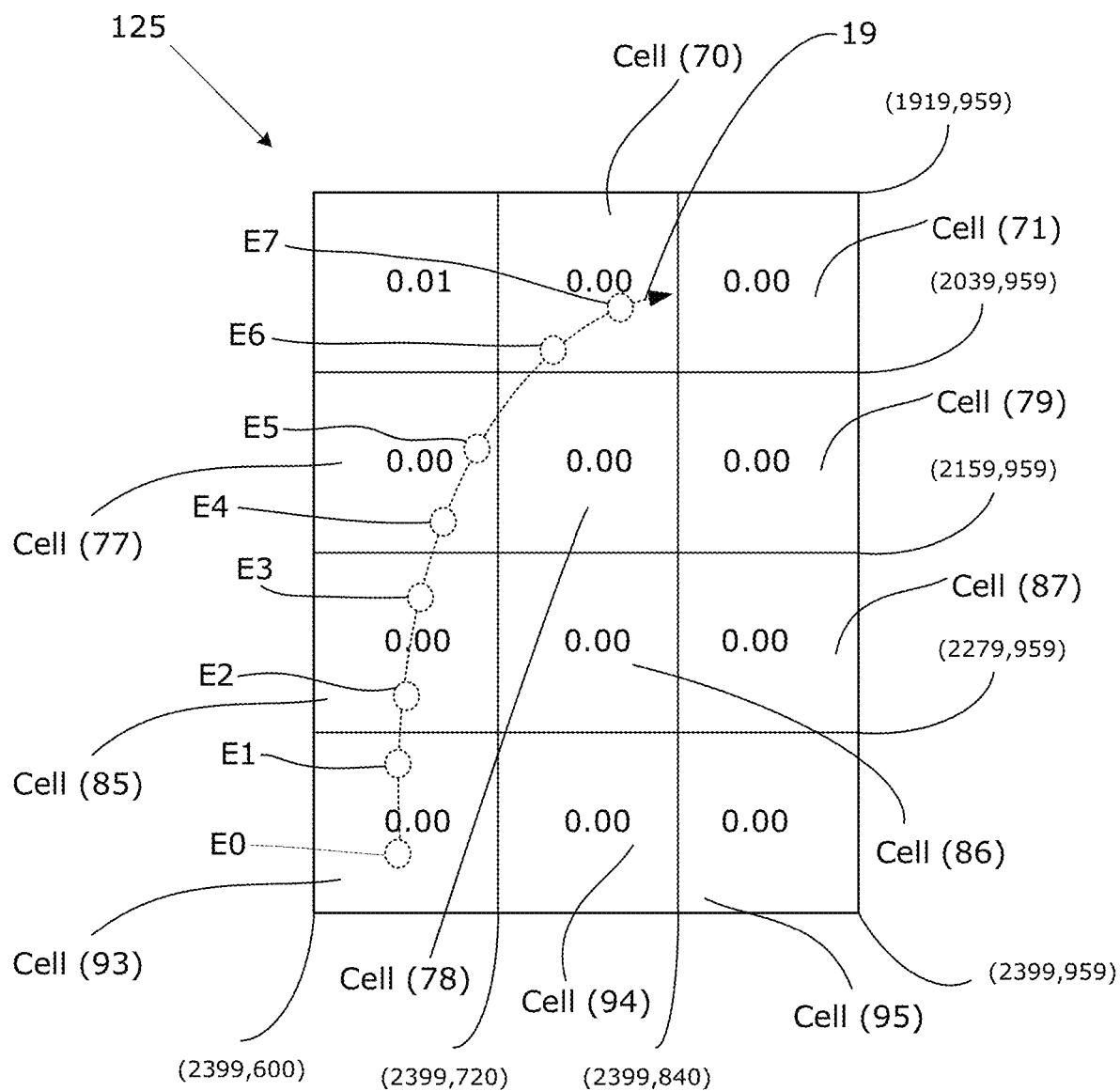
FIG. 10 is an enlarged view of the region FIG. 9 where the finger is swiped showing a plurality of touch points along the swipe.

The UI module 116 provides the touch interaction 280 as represented by its events E0-E7, to the gaze prediction module 124. The gaze prediction module 124 maps each touch event 195 to the grid cell 122 within which it lies. With reference to FIG. 10 it can be seen that events E0 and E1 are in the grid cell (93), events E2 and E3 are in the grid cell (85), events E4 and E5 are in the grid cell (77), and events E6 and E7 are in the grid cell (70). The touch event mapping table 290, depicted in FIG. 11, shows the grid cell mapping 297 of the individual touch events 195 forming the touch interaction 280 into their corresponding grid cells 122.

The touch interaction 280 is used, by the gaze prediction module 124 to estimate the user's gaze during that interaction. The gaze prediction module 124 upon receiving the touch interaction 280 from the UI module 116 updates the gaze prediction probability for all the grid cells 122 accordingly. For example, with reference to FIG. 10, the touch interaction 280 comprised of events E0-E7 traverses the grid cells 93, 85, 77 and 70. Accordingly, the gaze prediction module 124 sets the gaze probability 260 of those cells to 0.00 or a very low gaze probability 260. Additionally, the gaze prediction module 124 concludes that a touch interaction 280 in the form of a swipe which traverses the aforementioned cells was likely effected by a finger or touch input tool which also obscures other cells below the traversed cells. Accordingly, as seen in FIG. 10, the grid cells 71, 78, 79, 86, 87, 94 and 95 have all had their gaze probability 260 also set to 0.00 (or a very low gaze probability 260).

As discussed earlier, with reference to FIG. 5, when the probability of gazing at a touch interaction area 104 decreases due to a touch interaction 280 thereon, the probability of gazing at a gazing view area portion 106 increases. This is reflected in FIG. 9 where the gaze probability 260 of grid cells 122 outside a touch interaction area 104 has been increased to 0.03 or 0.02. As is known from probability theory, the sum of all probabilities of gazing for all cells must be equal to 1 or 100%. Accordingly, when the gaze probability 260 of the grid cells in region 125 drop to 0.00 due to the touch interaction 280, this is accompanied by an increase in gaze probability 260 of other grid cells 122 in a predicted gazing area 106. The predicted gazing area 106 is the portion of the main viewing area 102, which is outside the touch interaction area 104.

The proposed gaze prediction solution utilizes a gaze prediction function, referred to as p( ) and a decay function referred to as d( ). When processing a touch interaction 280 on a touch interaction area, such as touch interaction area 104, the gaze prediction module 124 first applies the gaze prediction function p( ) to determine the gaze probability 260 for the individual grid cells 122 of the main viewing area 102 of the touchscreen display 45. When no subsequent input touch interactions 280 are detected and provided to the gaze prediction module 124, the gaze prediction module 124 applies a decay function d( ) to update the gaze prediction for the individual grid cells 22. Where no touch interactions 280 are detected for some time, the decay function d( ) reverts the gaze probability 260 for all grid cells 122 to their default values as discussed with reference to FIG. 8.

Different scenarios are possible when computing the gaze probability 260 for the grid cells 122, as will be discussed with reference to FIGS. 12 and 13. In one scenario, a single input touch interaction 280 is detected, and no further touch interactions are detected for a period of time greater than the decay duration $T_D$ produced by the decay function d( ). In another scenario, a first input touch interaction 280 is followed by a second input touch interaction 280 before the expiration of the decay duration $T_D$. Due to the scale of the figures, it is not be feasible to display the grid lines and probability values. Regions of the main viewing area 102 of the touchscreen display 45 having lower gaze probabilities 260 are depicted in a darker shade of gray while regions of the main viewing area 102 of the touchscreen display 45 having higher gaze probabilities 260 are depicted in a lighter shade of gray.

Figure 12:
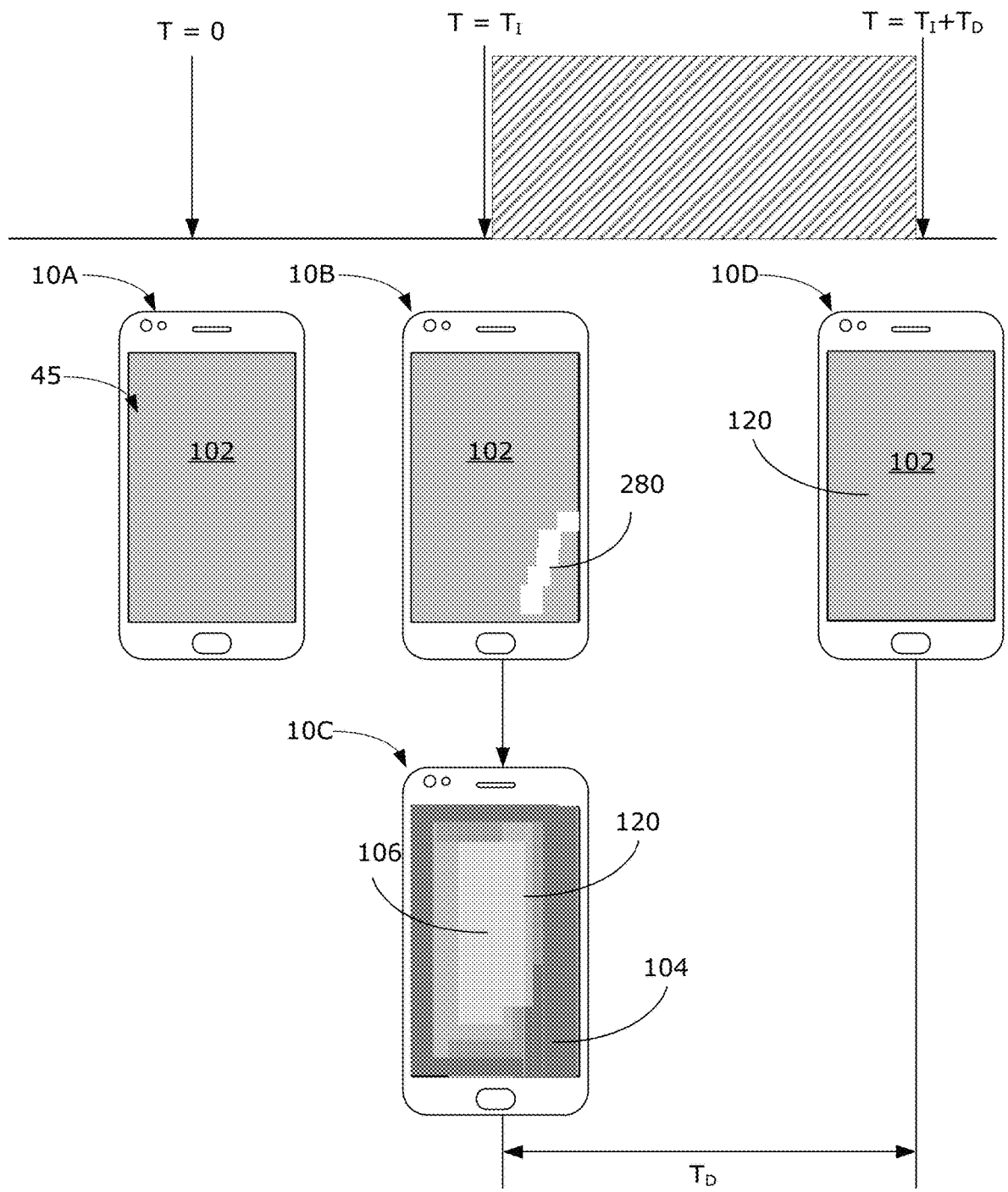
FIG. 12 is a diagram depicting a first use case in which two consecutive input touch interactions with a touch-enabled electronic device are spaced in time by a duration which is greater than a decay time.

Turning first to FIG. 12, there is shown a first scenario for gaze prediction based on a touch interaction 280, in accordance with example embodiments. Initially, at time T=0, the gaze probability 260 of all grid cells 122 of the main viewing area 102 is set to the default gaze probability value. This is represented by showing all of the main viewing area 102 in the same shade of gray for the touch-enabled electronic device labelled 10A. At time $T=T_1$, the user swipes the screen 48 of the touchscreen display 45 thus producing an input touch interaction 280, as shown in the touch-enabled electronic device representation labelled 10B. In response to the touch interaction 280, the gaze prediction module 124 computes the gaze probabilities 260 for the grid cells 122 of the main viewing area 102. As shown in the representation of the touch-enabled electronic device labelled 10C, the touch interaction area 104 in which the input touch interaction 280 has taken place has a darker gray shade indicating a lower gaze probability 260. Conversely, the predicted gazing area 106, which is in the center of the main viewing area 102 shows a lighter shade of gray indicting a higher gaze probability 260. Once the gaze prediction module 124 has computed the gaze probabilities 260 for all the grid cells, it executes the decay function d( ). In the embodiment shown in FIG. 12, no other input touch interactions 280 are detected for the time duration $T_D$. Accordingly, the gaze probabilities for the grid cells 122 gradually revert to the default gaze probability value at time $T=T_1+T_D$. This is illustrated in the touch-enabled electronic device labelled 10D, which shows the main viewing area 102 with the same shade of gray.

Figure 13:
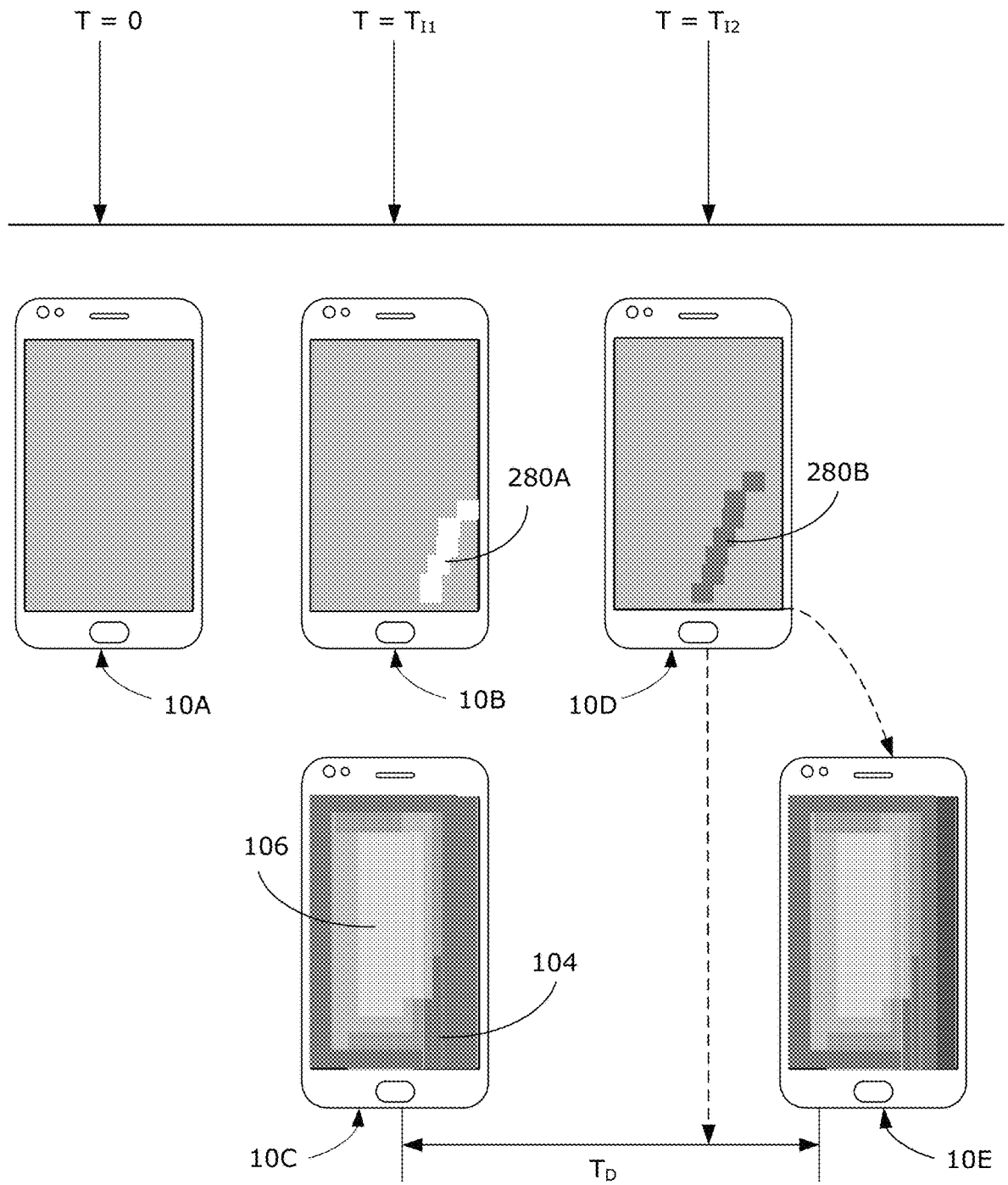
FIG. 13 is a diagram depicting a second use case in which a second input touch interaction with the touch-enabled electronic device takes place before the expiry of the decay time associated with a first input touch interaction.

Now turning to FIG. 13, which depicts a second scenario for gaze prediction based on a touch interaction, in accordance with example embodiments. Similar to the scenario of FIG. 12, the touch-enabled electronic device represented by the label 10A shows that at time T=0, all grid cells 122 have a default gaze probability 260, illustrated by showing the main viewing area 102 with the same shade of gray. At $T=T_{I1}$, a first input touch interaction 280A is detected. The gaze probabilities 260 are updated accordingly, as shown by the different shades of gray of the touch interaction area 104 and the predicted gazing area 106. After updating the gaze probabilities 260 in response to the first input touch interaction 280A, the gaze prediction module 124 executes the decay function d( ). The decay duration for the decay function is $T_D$ as before. However, at $T=T_{I2}$, as second input touch interaction 280B is detected. In the depicted scenario, the second input interaction 280B is detected and provided to the gaze prediction module 124 before the expiration of the decay duration $T_D$. In other words, $T_{I2}-T_{I2}<T_D$. In this scenario, the gaze probabilities 260 for the grid cells are updated before they revert to their default gaze probability values. This is demonstrated by the shades of gray in the touch-enabled electronic device labelled 10E.

Figure 14:
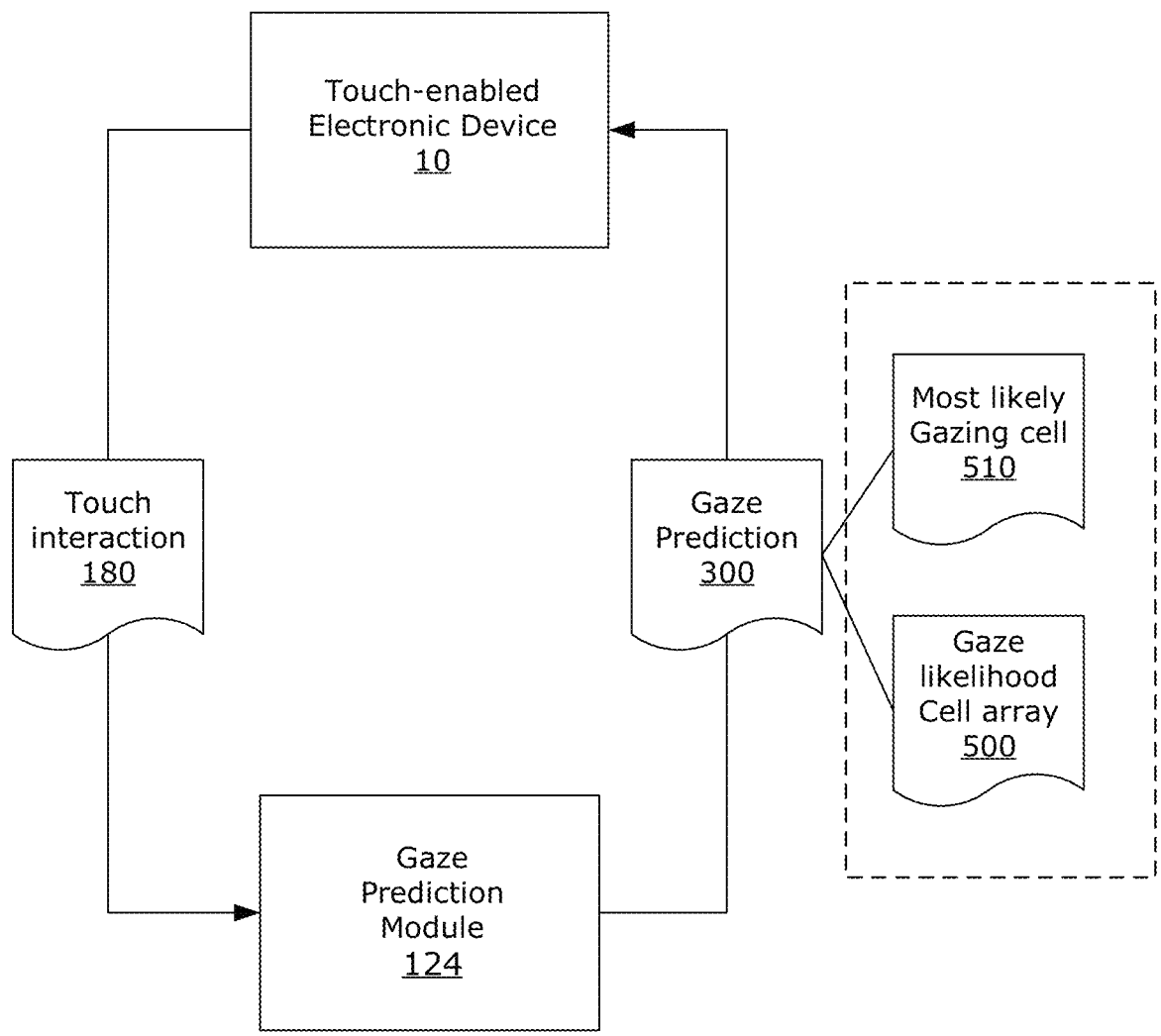
FIG. 14 is a high level diagram of a gaze prediction system, in accordance with example embodiments.

The gaze prediction module 124 utilizes a gaze prediction model. FIG. 14 shows a conceptual diagram of a gaze prediction system. The touch-enabled electronic device 10 provides touch interactions 280 to a gaze prediction module 124 which implements a gaze prediction model. The gaze prediction model can be based on one of: Bayesian, Kalaman Filter, Particle Filter, machine learning (ML) model or MDPs. The gaze prediction model predicts or updates gaze probabilities for the grid cells 122 of the main viewing area 102 of a touchscreen display 45 as described below.

Bayesian Inference

In one example embodiment, the gaze prediction model utilizes Bayesian inference to estimate the gaze probability based on a touch interaction. For any given grid cell 122, the system starts with a default gaze probability. As discussed above, the default gaze probability is the same for all cells since it is equally likely, in the absence of any touch events, that the user is gazing at any grid cell (i). The default gaze probability of a cell (i) is computed as follows:

$$P_{default}(Gaze_i)=1/*N) \text{ or simply:}$$

$$P_{default}(Gaze_i)=1/\text{Total number of grid cells.}$$

In a first example embodiment, the probability of gazing at a cell given the touch interaction at one or more cells is denoted P(Gaze$_i$|Touch interaction). From probability theory it is known that:

$$P(B|A) = P(A|B) \cdot \frac{P(B)}{P(A)}$$

Using the above formula, and applying it to the gaze prediction model, we obtain:

$$P(Gaze_i|Touch\ Interaction) = \frac{P(Touch\ Interaction|Gaze_i) \cdot P(Gaze_i)}{P(Touch\ Interaction)} \quad (I)$$

The term P(Touch Interaction|Gaze$_i$) represents the average probability of a touch interaction when that the user was gazing at cell (i). Since a touch interaction 280 is comprised of a plurality of touch events 195, then the probability of the touch interaction when the user is gazing at cell (i) is the intersection of the probabilities of the individual touch events 195 comprising the touch interaction 280, when the user is gazing at the grid cell (i). Assuming the touch interaction has (n) touch events, the term P(Touch Interaction|Gaze$_i$) can be represented as:

$$P(Touch\ Interaction|Gaze_i)=P(Touch\ Event_1|Gaze_i \cap Touch\ Event_2|Gaze_i \cap \ldots Touch\ Event_n|Gaze_i) \quad (II)$$

From probability theory, the equation (II) can also be written as:

$$P(\text{Touch Interaction}|\text{Gaze}_i) = \Pi_{(j=1 \text{ to } n)} P(\text{Touch Event}_j|\text{Gaze}_i) \quad \text{(III)}$$

From equation (III) above, it is clear that the probability of a touch interaction 280 given that the user is gazing at a grid cell (i) is the product of the probabilities of the individual touch events 195 given that the user is gazing at cell (i). To obtain such probabilities, usability sessions are conducted during which the user is performing many input touch interactions 280 while at the same time their gaze is being monitored using cameras as discussed above with reference to the prior art. A plurality of tables are generated from the usability studies which assist in determining touch event probabilities 270 and corresponding gaze probabilities 260. For example, with reference to FIGS. 15A and 15B, during usability sessions the user performs a touch interaction 280A in the direction of the arrow as shown. FIG. 15A depicts a table 420A showing the observed touch event probabilities 270, for all grid cells (i), from repeated touch interactions generally similar to 280A. For example, the touch event probabilities 270 for the grid cells right under the interaction 280A are relatively high at 0.09, while grid cell (50) has a touch event probability of 0.02 and grid cell (44) has a touch event probability of 0.03. While the user is performing the input touch interaction 280A, during the usability session, the user's gaze is being monitored and table 430A of FIG. 15B shows the observed gaze probabilities in the predicted gazing area 106A. Similarly, with reference to FIG. 16A, which depicts the observed touch event probabilities table 420B, the user performs an input touch interaction 280B and as a result, the grid cell (50) has a touch event probability 270 of 0.06 while grid cell (44) has a touch event probability of 0.03. The corresponding observed gaze probabilities table 430B is shown in FIG. 16B. As can be seen in the observed gaze probabilities table 430B, the grid cell (50) has an observed gaze probability 260 of 0.00 while the grid cell (44) has an observed gaze probability 260 of 0.03. A plurality of table pairs, such as (420A, 430A) and (420B, 430B) are generated during the usability sessions with the user's performing a variety of touch interactions 280. The table pairs of touch event probabilities table 420 and the corresponding observed gaze probabilities tables 430 are stored on the touch-enabled electronic device 10 in storage unit 178.

To determine a probability of a particular touch event (j) when the user is gazing at a cell (i), i.e. P(Touch Event$_j$|Gaze$_i$), the gaze probabilities tables 430 are examined. If the observed gaze probability for the grid cell (i) in a given observed gaze probabilities table 430 is non-zero, then the corresponding observed touch event probability 270 for the same cell (i) in the corresponding touch event probabilities table 420 is read by the gaze prediction module 124 and stored. This is repeated for all table pairs (420,430) and the touch event probabilities 270 for cell (i) read by the gaze prediction module 124 are averaged out to give the term. P(Touch Event$_j$|Gaze$_i$). As an example, with reference to FIGS. 15A-15B and 16A-16B, the generated tables 420A, 430A, 420B and 430B indicate that grid cell (50) has a gaze probability 260 of 0 in table 430B. Accordingly, the corresponding touch event probability 270 of grid cell (50) in table 420B is not considered when computing P(Touch Event$_j$|Gaze$_{50}$) (since that touch event 195 took place when the user was NOT gazing at grid cell 50, as shown in the observed gaze probabilities table 430B. However, with reference to the observed gaze probabilities table 430A, the gaze probability 260 for grid cell (50) is non-zero, therefore the corresponding touch event probability 270 for grid cell (50) in table 420A (valued at 0.02) is considered when computing P(Touch Event$_j$|Gaze$_{50}$). In case of grid cell 44, both the touch event probability 270 in table 420A (valued at 0.03) and the touch event probability 270 in the observed gaze probabilities table 430A (valued also at 0.03) are used to compute the average P(Touch Event$_j$|Gaze$_{50}$).

The method of computing a table 436 of average conditional touch event probabilities given the gaze at a cell (i) is described with reference to FIG. 18. The method 800 may be carried out by the gaze prediction module 124. Assuming the usability sessions have produced a number (k) of touch event probabilities tables 420 and a corresponding number (k) of observed gaze probabilities tables 430, similar to the tables (420A, 420B) and (430A, 430B). The method 800 is repeated for each grid cell (i) of the main viewing area 102 of a touchscreen display 45. The method starts at step 810 where an observed gaze probabilities table such as table 420B is selected. At step 820, the gaze probability 260 stored in the grid cell (i) of the observed gaze probabilities table 420 is checked whether it has a non-zero gaze probability value 260. If the gaze probability 260 for cell (i) in the observed gaze probabilities table 430 is 0, then control goes to step 850 where it is checked whether all observed gaze probabilities tables 430 stored on the device have been checked. If, on the other hand, the gaze probability stored in cell (i) of the observed gaze probabilities table 420 is non-zero then control goes to step 830. At step 830, the touch event probability 270 for the grid cell (i) is read from the touch event probabilities table 420 corresponding to the currently selected observed gaze probabilities table 430. For example, as discussed above, the touch event probabilities table 420A corresponds to the observed gaze probabilities table 430A. At step 840, the read touch event probability 270 from the touch even probabilities table is used to compute the average conditional touch event given gaze probabilities table 436 for cell (i). At step 850, it is checked whether there are further observed gaze probabilities tables 430 to process. If all observed gaze probabilities tables 430 have been processed then the method ends at 860. If there are still observed gaze probabilities tables 430 which have not been processed, then control goes back to step 810 where the next observed gaze probabilities table 430 is selected. The method 800 is repeated for every grid cell (i) until a fully populated average conditional touch event given gaze probabilities table 436, as shown in FIG. 17 is populated.

In some example embodiments, the method 800 for populating the average conditional touch event given gaze probabilities table 436 is executed when the device is first provisioned for use.

The term P(Gaze$_i$) of equation (I) represents the probability that the user is gazing at a particular cell (i). Period. This information is obtain by observing the user's gaze during usability. For example, a camera is used to observe the user's gaze over a duration of time when the user is using the touch-enabled electronic device 10. The average time the user spends looking at each grid cell 122 is recorded. The resulting gaze table is shown as the average gaze probabilities table 440 in FIG. 19. The average gaze probability 260 for the different grid cells 122 depends on the applications used by the user during the training period. As seen in FIG. 19, the user gazes at certain grid cells 122 more than others. The term P(Gaze$_i$) for a grid cell (i) is obtained by looking up the average gaze probability 260 in the element of the average gaze probabilities table 440 which corresponds to the grid cell (i).

Figure 20:
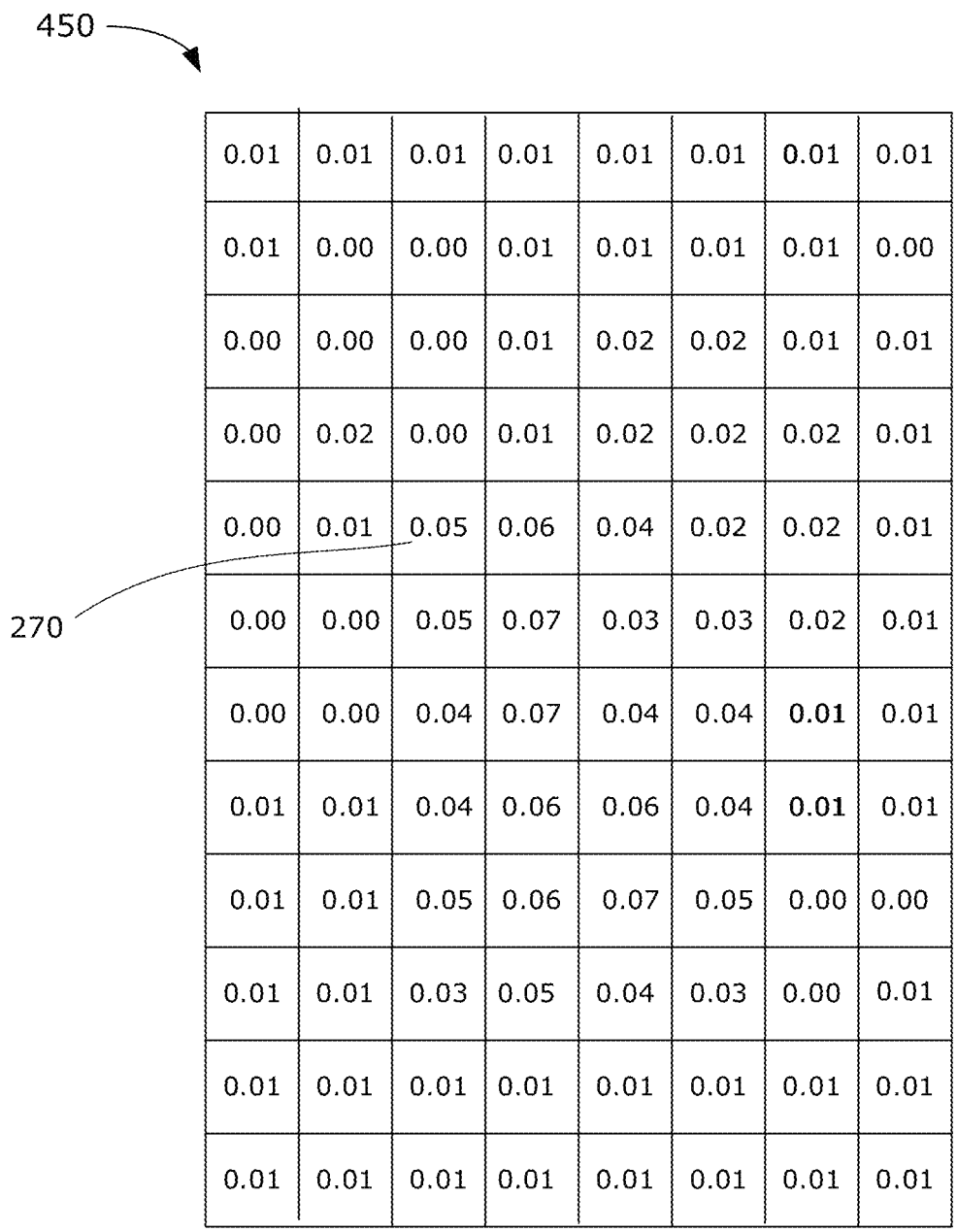
FIG. 20 depicts a able of average observed touch event probabilities for all grid cells of the main viewing area the touchscreen display of a touch-enabled electronic device.

The average gaze probability is determined during usability sessions. During the usability sessions, the average touch event for each grid cell (i) is recorded in an average touch event probability table 450, as shown in FIG. 20. Since a touch interaction term P(Touch Interaction) can be represented as P(Touch Event$_1$, Touch Event$_2$, ... Touch Event$_n$), then P(Touch Interaction)=$\Pi_{(j=1\ to\ n)}$ P(Touch Event$_j$). Accordingly, the term P(Touch Interaction) is the product of the touch event probabilities 270 corresponding to the touch events 195 which comprise the input touch interaction 280.

Figure 21:
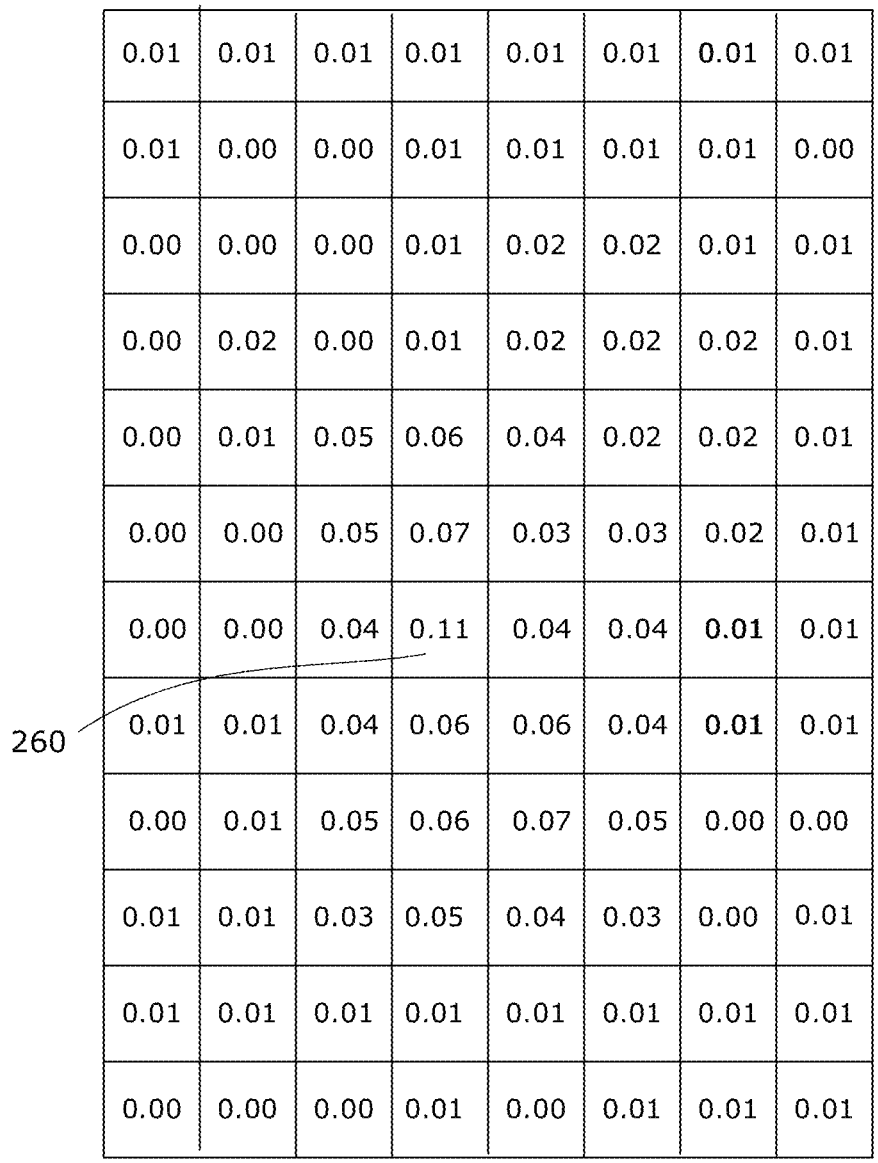
FIG. 21 depicts a gaze likelihood cell array representing the predicted gaze likelihood probabilities for all grid cells of the viewing area of a touchscreen display of a touch-enabled electronic device.

Now that all of the components of the right-hand-side of equation (I) are available, a gaze likelihood cell array 500, shown in FIG. 21, is obtained by computing equation (I) for every grid cell 122 (i). The grid cell 122 of the gaze likelihood cell array 500, which has the highest gaze probability is the most likely gazing cell 510.

Figure 22:
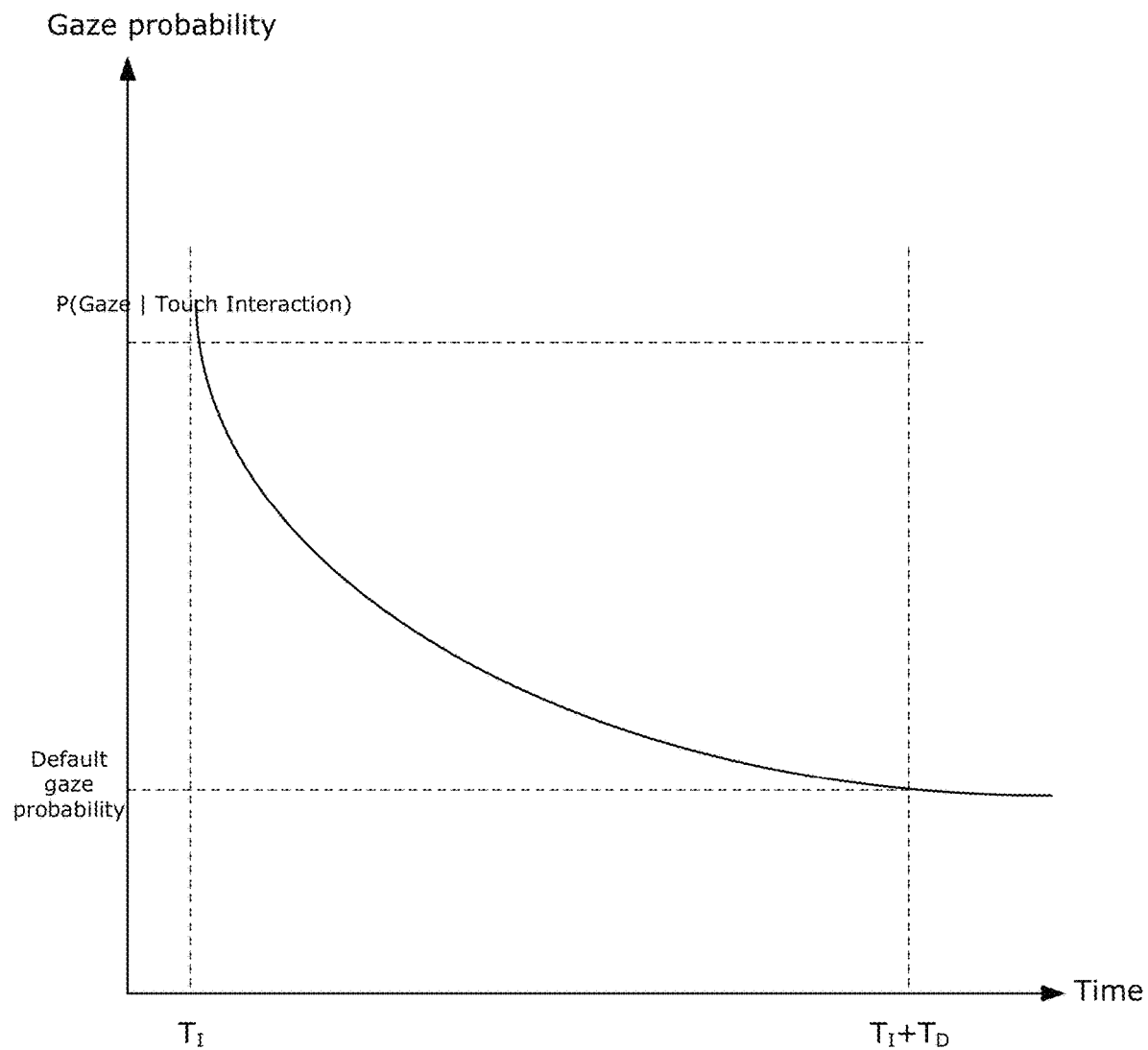
FIG. 22 depicts an example of a decay function associated with a gaze probability.

The decay function, reference above as function d( ), which is used with the Bayesian inference gaze prediction method, is depicted in FIG. 22. The vertical axis shows the decay function applied to the predicted gaze probability 260 given an input touch interaction 280. At T$_I$, the gaze probability given the touch interaction is estimated at P(Gaze|Touch interaction). Assuming no new interactions take place for a duration of T$_D$, the gaze probability declines in accordance with the decay function until at time T$_I$+T$_D$ it is equal to the default probability value (1/M*N).

Advantageously, the gaze probability for all grid cells given a particular touch interaction can be obtained without the use of any cameras or other image sensing devices and without the need to employ computationally intensive image recognition operations. Simply table look-up, averaging and multiplication operations are used to predict the gaze probabilities for the grid cells 122.

Deep Neural Networks

In another example embodiment, different types of deep neural networks can be used to estimate the grid cell(s) with highest gaze probability based on touch interactions. A neural network consists of neurons. A neuron is a computational unit that uses x$_s$ and an intercept of 1 as inputs. An output from the operation computational unit may be:

$$h_{W,b}(x) = f(W^T x) = f\left(\sum_{s=1}^{n} W_s x_s + b\right) \quad (1\text{-}1)$$

Where: s=1, 2, ... n, n is a natural number greater than 1, W$_s$ is a weight of x$_s$, b is an offset (i.e. bias) of the neuron and f is an activation function (activation functions) of the neuron and used to introduce a nonlinear feature to the neural network, to convert an input of the neuron to an output. The output of the activation function may be used as an input to a neuron of a following convolutional layer in the neural network. The activation function may be a sigmoid function. The neural network is formed by joining a plurality of the foregoing single neurons. In other words, an output from one neuron may be an input to another neuron. An input of each neuron may be associated with a local receiving area of a previous layer, to extract a feature of the local receiving area. The local receiving area may be an area consisting of several neurons.

A deep neural network (Deep Neural Network, DNN) is also referred to as a multi-layer neural network and may be understood as a neural network that includes a first layer (generally referred to as an input layer), a plurality of hidden layers, and a final layer (generally referred to as an output layer). The "plurality" herein does not have a special metric. A layer is considered a fully connected layer when there is a full connection between two adjacent layers of the neural network. To be specific, all neurons at an i$^{th}$ layer is connected to any neuron at an (i+1)$^{th}$ layer. Although the DNN seems extremely complex, processing at each layer is actually not complex. Briefly, the operation at each layer is indicated by the following linear relational expression $\vec{y}=\alpha(W\vec{x}+\vec{b})$, where x is an input vector, $\vec{y}$ is an output vector, $\vec{b}$ is an offset vector, W is a weight matrix (also referred to as a coefficient), and α( ) is an activation function. At each layer, only such a simple operation is performed on an input vector $\vec{x}$, to obtain an output vector $\vec{y}$. Because there is a large quantity of layers in the DNN, there is also a large quantity of coefficients W and offset vectors $\vec{b}$. Definitions of these parameters in the DNN are as follows: The coefficient W is used as an example. It is assumed that in a three-layer DNN (i.e. a DNN with three hidden layers), a linear coefficient from a fourth neuron at a second layer to a second neuron at a third layer is defined as $w_{24}^3$. The superscript 3 represents a layer of the coefficient W, and the subscript is corresponding to the output layer-3 index 2 and the input layer-2 index 4. In conclusion, a coefficient from a k$^{th}$ neuron at an (L−1)$^{th}$ layer to a j$^{th}$ neuron at an L$^{th}$ layer is defined as $W_{jk}^L$. It should be noted that there is no W parameter at the input layer. In the DNN, more hidden layers enable the DNN to depict a complex situation in the real world. In theory, a DNN with more parameters is more complex, has a larger "capacity", and indicates that the DNN can complete a more complex learning task. Training of the deep neural network is a weight matrix learning process. A final purpose of the training is to obtain a trained weight matrix (a weight matrix consisting of learned weights W of a plurality of layers) of all layers of the deep neural network.

A convolutional neural network (CNN, Convolutional Neural Network) is a deep neural network with a convolutional structure. The convolutional neural network includes a feature extractor consisting of a convolutional layer and a sub-sampling layer. The feature extractor may be considered as a filter. A convolution process may be considered as performing convolution on an input image or a convolutional feature map (feature map) by using a trainable filter. The convolutional layer indicates a layer of neurons at which convolution processing is performed on an input in the convolutional neural network. At the convolutional layer of the convolutional neural network, one neuron may be connected only to neurons at some neighboring layers. One convolutional layer usually includes several feature maps, and each feature map may be formed by some neural cells arranged in a rectangle. Neural cells at a same feature map share a weight. The shared weight herein is a convolutional kernel. The shared weight may be understood as being unrelated to a manner and a position of image information extraction. A hidden principle is that statistical information of a part of an image is the same as that of another part. This indicates that image information learned in a part may also be used in another part. A plurality of convolutional kernels may be used at a same convolutional layer to extract different image information. Generally, a larger quantity of convolutional kernels indicates that richer image information is reflected by a convolution operation.

A convolutional kernel may be initialized in a form of a matrix of a random size. In a training process of the convolutional neural network, a proper weight may be obtained by performing learning on the convolutional kernel. In addition, a direct advantage brought by the shared weight is that a connection between layers of the convolutional neural network is reduced and a risk of overfitting is lowered.

In the process of training a deep neural network, to enable the deep neural network to output a predicted value that is as close to a truly desired value as possible, a predicted value of a current deep neural network and a truly desired target value may be compared, and a weight vector of each layer of the deep neural network is updated based on a difference between the predicted value and the truly desired target value (Certainly, there is usually an initialization process before a first update. To be specific, a parameter is preconfigured for each layer of the deep neural network). For example, if the predicted value of a network is excessively high, continuously adjust a weight vector to lower the predicted value, until the deep neural network can predict the truly desired target value. Therefore, "how to compare a difference between a predicted value and a target value" needs to be predefined. To be specific, a loss function (loss function) or an objective function (objective function) needs to be predefined. The loss function and the objective function are important equations used to measure the difference between a predicted value and a target value. For example, the loss function is used as an example. A higher output value (loss) of the loss function indicates a greater difference. In this case, training the deep neural network is a process of minimizing the loss.

In the convolutional neural network, an error back propagation (back propagation, BP) algorithm may be used in a training phase (i.e. during training) to revise a value of a parameter in an initial super-resolution model, so that a re-setup error loss of the super-resolution model becomes smaller. Specifically, an error loss is generated in a process from forward propagation of an input signal to signal output. The parameter in the initial super-resolution model is updated through back propagation of error loss information, so that the error loss is converged. The back propagation algorithm is a back propagation movement dominated by an error loss, and is intended to obtain a most optimal super-resolution model parameter, for example, a weight matrix.

As described in the foregoing basic concept introduction, a convolutional neural network is a deep neural network with a convolutional structure, and is a deep learning (deep learning) architecture. The deep learning architecture indicates that a plurality of layers of learning is performed at different abstraction layers by using a machine learning algorithm. As a deep learning architecture, the CNN is a feed-forward (feed-forward) artificial neural network. Each neural cell in the feed-forward artificial neural network may respond to an image input to the neural cell.

Figure 24:
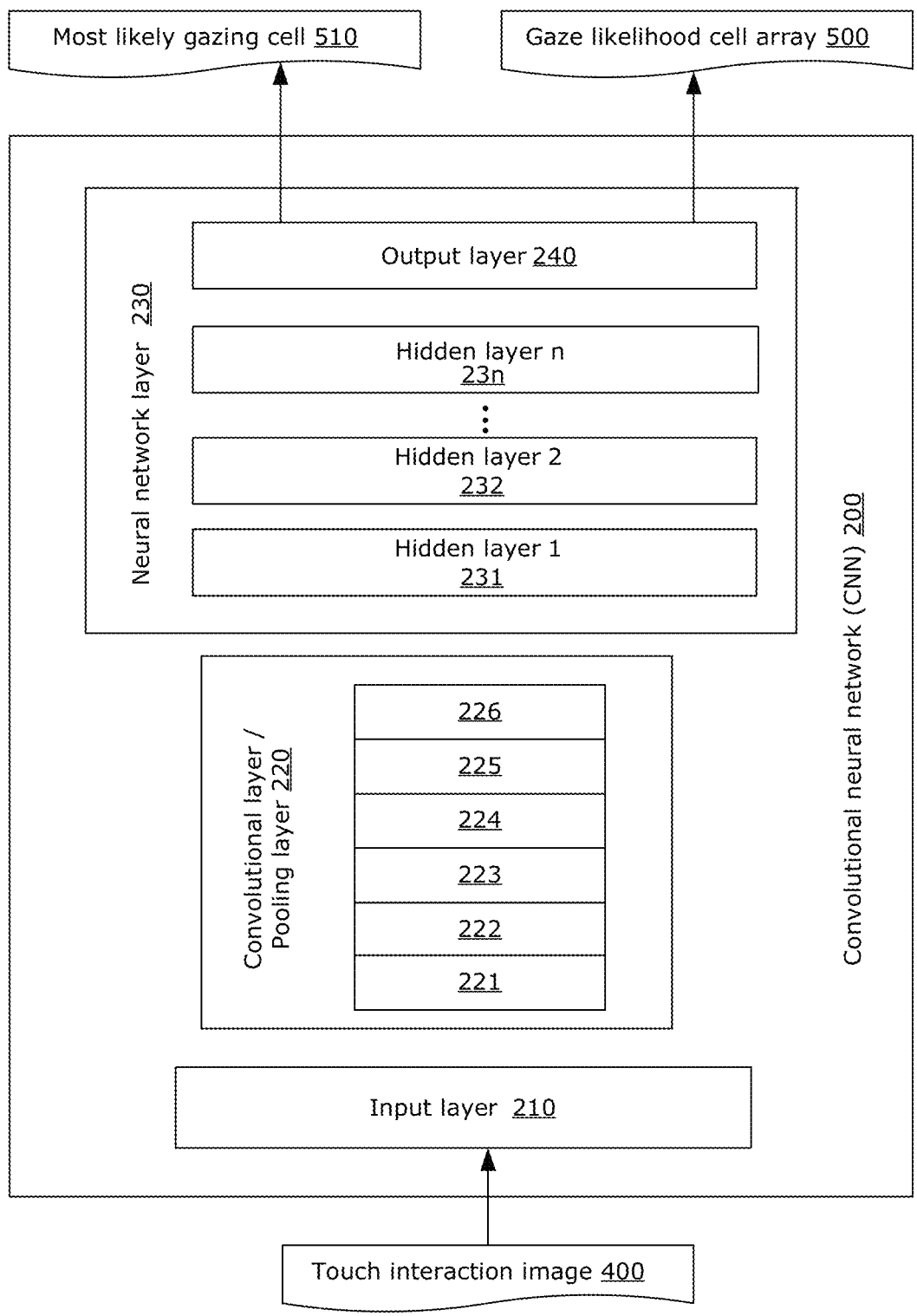
FIG. 24 depicts a convolutional neural network (CNN) for carrying out a gaze prediction method, in accordance with example embodiments of the present disclosure.

As shown in FIG. 24, a convolutional neural network (CNN) 200 may include an input layer 210, a convolutional layer/pooling layer 220 (the pooling layer is optional), and a neural network layer 230.

Figure 18:
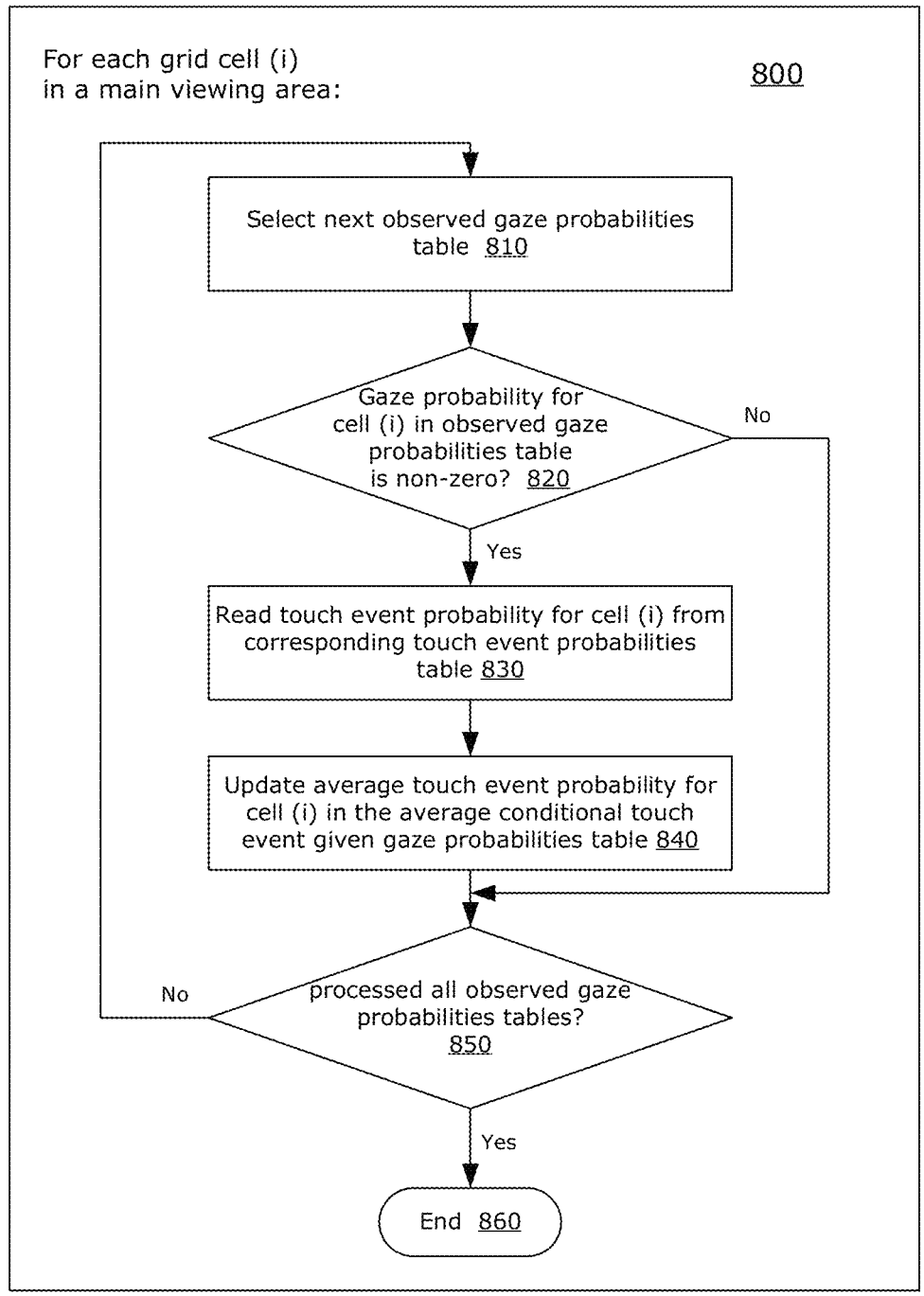
FIG. 18 depicts a method for obtaining the average conditional touch event given gaze probabilities table similar to the one depicted in FIG. 17.

The convolutional layer/pooling layer 220 shown in FIG. 18 may include, for example, layers 221 to 226. For example: In an implementation, the layer 221 is a convolutional layer, the layer 222 is a pooling layer, the layer 223 is a convolutional layer, the layer 224 is a pooling layer, the layer 225 is a convolutional layer, and the layer 226 is a pooling layer; in another implementation, the layers 221 and 222 are convolutional layers, the layer 223 is a pooling layer, the layers 224 and 225 are convolutional layers, and the layer 226 is a pooling layer. In other words, an output from a convolutional layer may be used as an input to a following pooling layer, or may be used as an input to another convolutional layer, to continue a convolution operation.

The following describes internal operating principles of a convolutional layer by using the convolutional layer 221 as an example.

The convolutional layer 221 may include a plurality of convolutional operators. The convolutional operator is also referred to as a kernel. A role of the convolutional operator in image processing is equivalent to a filter that extracts specific information from an input image matrix. In essence, the convolutional operator may be a weight matrix. The weight matrix is usually predefined. In a process of performing a convolution operation on an image, the weight matrix is usually processed one pixel after another (or two pixels after two pixels . . . , depending on a value of a stride (stride)) in a horizontal direction on the input image, to extract a specific feature from the image. A size of the weight matrix needs to be related to a size of the image. It should be noted that a depth dimension (depth dimension) of the weight matrix is the same as a depth dimension of the input image. In the convolution operation process, the weight matrix extends to the entire depth of the input image. Therefore, after convolution is performed on a single weight matrix, convolutional output with a single depth dimension is output. However, the single weight matrix is not used in most cases, but a plurality of weight matrices with same dimensions (row×column) are used, in other words, a plurality of same-model matrices. Outputs of all the weight matrices are stacked to form the depth dimension of the convolutional image. It can be understood that the dimension herein is determined by the foregoing "plurality". Different weight matrices may be used to extract different features from the image. For example, one weight matrix is used to extract image edge information, another weight matrix is used to extract a specific color of the image, still another weight matrix is used to blur unneeded noises from the image, and so on. The plurality of weight matrices have a same size (row×column). Feature graphs obtained after extraction performed by the plurality of weight matrices with the same dimension also have a same size, and the plurality of extracted feature graphs with the same size are combined to form an output of the convolution operation.

Weight values in the weight matrices need to be obtained through a large amount of training in actual application. The weight matrices formed by the weight values obtained through training may be used to extract information from the input image, so that the convolutional neural network 200 performs accurate prediction.

When the convolutional neural network 200 has a plurality of convolutional layers, an initial convolutional layer (such as 221) usually extracts a relatively large quantity of common features. The common feature may also be referred to as a low-level feature. As a depth of the convolutional neural network 200 increases, a feature extracted by a deeper convolutional layer (such as 226) becomes more complex, for example, a feature with high-level semantics or the like. A feature with higher-level semantics is more applicable to a to-be-resolved problem.

Because a quantity of training parameters usually needs to be reduced, a pooling layer usually needs to periodically follow a convolutional layer. To be specific, at the layers 221 to 226 shown in the convolutional layer/pooling layer 220 in FIG. 24, one pooling layer may follow one convolutional layer, or one or more pooling layers may follow a plurality of convolutional layers. In an image processing process, an only purpose of the pooling layer is to reduce a space size of the image. The pooling layer may include an average pooling operator and/or a maximum pooling operator, to perform sampling on the input image to obtain an image of a relatively small size. The average pooling operator may compute a pixel value in the image within a specific range, to generate an average value as an average pooling result. The maximum pooling operator may obtain, as a maximum pooling result, a pixel with a largest value within the specific range. In addition, just like the size of the weight matrix in the convolutional layer needs to be related to the size of the image, an operator at the pooling layer also needs to be related to the size of the image. The size of the image output after processing by the pooling layer may be smaller than a size of the image input to the pooling layer. Each pixel in the image output by the pooling layer indicates an average value or a maximum value of a subarea corresponding to the image input to the pooling layer.

After the image is processed by the convolutional layer/pooling layer 220, the convolutional neural network 200 is still incapable of outputting desired output information. As described above, the convolutional layer/pooling layer 220 only extracts a feature, and reduces a parameter brought by the input image. However, to generate final output information (desired category information or other related information), the convolutional neural network 200 needs to generate an output of a quantity of one or a group of desired categories by using the neural network layer 230. Therefore, the neural network layer 230 may include a plurality of hidden layers (such as 231, 232, to 23$n$ in FIG. 24) and an output layer 240. A parameter included in the plurality of hidden layers may be obtained by performing pre-training based on related training data of a specific task type. For example, the task type may include image recognition, image classification, image super-resolution re-setup, or the like.

The output layer 240 follows the plurality of hidden layers in the neural network layers 230. In other words, the output layer 240 is a final layer in the entire convolutional neural network 200. The output layer 240 has a loss function similar to category cross-entropy and is specifically used to calculate a prediction error. Once forward propagation (propagation in a direction from input layer 210 to output layer 240 in FIG. 24 is forward propagation) is complete in the entire convolutional neural network 200, back propagation (propagation in a direction from 240 to 210 in FIG. 24 is back propagation) starts to update the weight values and offsets of the foregoing layers, to reduce a loss of the convolutional neural network 200 and an error between an ideal result and a result output by the convolutional neural network 200 by using the output layer.

Figure 23:
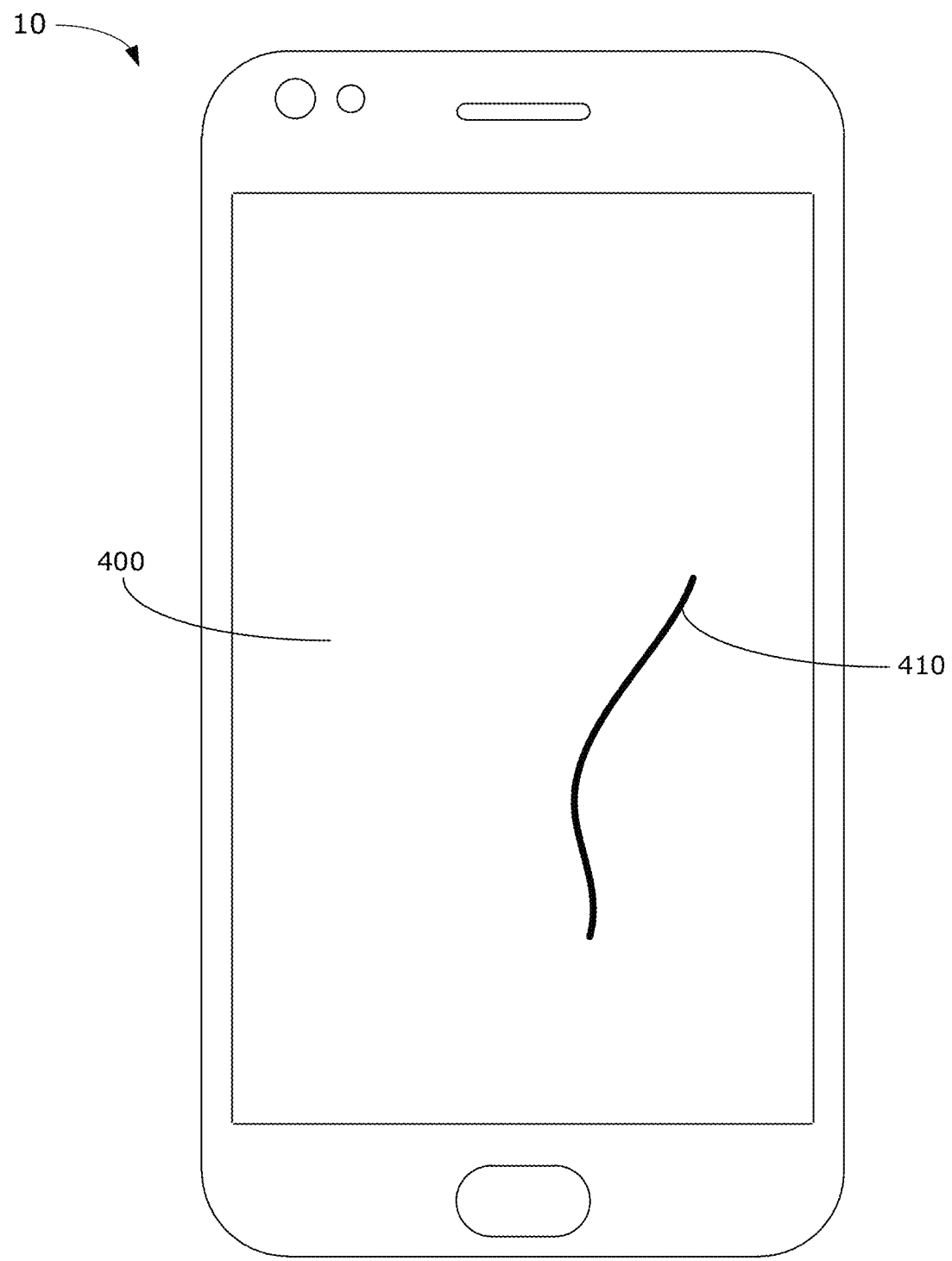
FIG. 23 depicts a touch interaction, in the form of a swipe, represented as a stroke trajectory on an image, in accordance with embodiments of the present disclosure.

The gaze prediction model described above may be based on convolutional neural networks, such as the CNN 200. The CNN 200 can be used to determine the most likely gaze cell 510 which is comprised of the grid cell number of the grid cell 122 having the highest gaze probability. The output of the CNN 200 can also include a two-dimensional array 500 (of dimensions M×N) in which the elements each contains the gaze probability (likelihood) for each grid cell 122. The input of the CNN 200 is the touch interaction image 400, shown in FIG. 23, which contains the touch stroke trajectory 410 representing the touch interaction 280. The model is trained by a plurality of training touch trajectories corresponding to touch interactions, and a plurality of average gaze probabilities corresponding to the plurality of training touch trajectories. The training touch trajectories may be in the form of touch interaction images similar to touch interaction image 400 containing the touch stroke trajectory 410. The plurality of average gaze probabilities corresponding to the training touch trajectories may be average gaze probability data as detected by an image sensor as known in the art.

It should be noted that the convolutional neural network 200 shown in FIG. 24 is merely used as an example of a convolutional neural network. In actual application, the convolutional neural network may exist in a form of another network model.

Certain adaptations and modifications of the described embodiments can be made. Therefore, the above discussed embodiments are considered to be illustrative and not restrictive.

The invention claimed is:

1. A gaze prediction method, comprising:
receiving an input touch interaction applied to a touchscreen display of a touch-enabled device, the input touch interaction being detected by a touchscreen driver and a touch sensing system as a plurality of input touch events;
mapping the plurality of input touch events to a plurality of virtual grid cells arranged on the touchscreen display;
predicting, by a gaze prediction module, a gaze probability for each of the plurality of virtual grid cells based on the plurality of touch events; and
obtaining a predicted gazing area on the touchscreen display based on the gaze probability for each of the plurality of virtual grid cells.

2. The method of claim 1, wherein the gaze prediction model predicts the gaze probability for each virtual grid cell of the plurality of virtual grid cells based on:
an average conditional touch event given gaze probability for the virtual grid cell;
an average gaze probability for the virtual grid cell; and
an average touch event probability for the virtual grid cell.

3. The method of claim 2, wherein the average conditional touch event given gaze probability for the virtual grid cell is determined by correlating corresponding virtual grid cells for an observed touch event probabilities table and a corresponding observed gaze probabilities table.

4. The method of claim 3, wherein the observed touch event probabilities table and the corresponding observed gaze probabilities table are populated during usability sessions by detecting a user's gaze using an image sensing device and correlating the user's gaze with corresponding observed touch events.

5. The method of claim 2, wherein the average gaze probability is determined during usability sessions by detecting a user's gaze using an image sensing device.

6. The method of claim 2, wherein the average touch event probability for the virtual grid cell is determined during usability sessions by detecting touch events on the virtual grid cell.

7. The method of claim 1, wherein the gaze prediction module utilizes a gaze prediction model based on one of Bayesian inference or convolutional neural networks.

8. The method of claim 7, wherein the gaze prediction model is based on convolutional neural networks, and the gaze prediction model predicts the gaze probability for each virtual grid cell of the plurality of virtual grid cells based on:
a plurality of training touch trajectories corresponding to a plurality of touch interactions; and
a plurality of average gaze probabilities corresponding to the plurality of training touch trajectories.

9. A touch-enabled device, comprising:
a touchscreen display;
a processor coupled to the touchscreen display; and
a non-transitory memory coupled to the processor, the non-transitory memory storing machine-executable instructions which, when executed by the processor, cause the touch-enabled device to:
receive an input touch interaction applied to the touchscreen display the input touch interaction being detected by a touchscreen driver and a touch sensing system as a plurality of input touch events;
map the plurality of input touch events to a plurality of virtual grid cells arranged on the touchscreen display;
predict, by a gaze prediction module, a gaze probability for each of the plurality of virtual grid cells based on the plurality of touch events; and
obtain a predicted gazing area on the touchscreen display based on the gaze probability for each of the plurality of virtual grid cells.

10. The touch-enabled device of claim 9, wherein the gaze prediction model predicts the gaze probability for each virtual grid cell of the plurality of virtual grid cells based on:
an average conditional touch event given gaze probability for the virtual grid cell;
an average gaze probability for the virtual grid cell; and
an average touch event probability for the virtual grid cell.

11. The touch-enabled device of claim 10, wherein the average conditional touch event given gaze probability for the virtual grid cell is determined by correlating corresponding virtual grid cells for an observed touch event probabilities table and a corresponding observed gaze probabilities table.

12. The touch-enabled device of claim 11, wherein the observed touch event probabilities table and the corresponding observed gaze probabilities table are populated during usability sessions by detecting a user's gaze using an image sensing device and correlating the user's gaze with corresponding observed touch events.

13. The touch-enabled device of claim 10, wherein the average gaze probability for the virtual grid cell is determined during usability sessions by detecting a user's gaze using an image sensing device.

14. The touch-enabled device of claim 9, wherein the gaze prediction module utilizes a gaze prediction model based on one of Bayesian inference or convolutional neural networks.

15. The touch-enabled device of claim 14, wherein the gaze prediction model is based on convolutional neural networks, and the gaze prediction model predicts the gaze probability for each virtual grid cell of the plurality of virtual grid cells based on:
a plurality of training touch trajectories corresponding to a plurality of touch interactions; and
a plurality of average gaze probabilities corresponding to the plurality of training touch trajectories.

16. A non-transitory computer-readable medium having machine-executable instructions stored thereon, the machine-executable instructions, when executed by a processor of a touch-enabled device, cause the touch-enabled device to:
receive an input touch interaction applied to a touchscreen display of the touch-enabled device, the input touch interaction being detected by a touchscreen driver and a touch sensing system as a plurality of input touch events;
map the plurality of input touch events to a plurality of virtual grid cells arranged on the touchscreen display;
predict, by a gaze prediction module, a gaze probability for each of the plurality of virtual grid cells based on the plurality of touch events; and
obtain a predicted gazing area on the touchscreen display based on the gaze probability for each of the plurality of virtual grid cells.

* * * * *

UNITED STATES PATENT AND TRADEMARK OFFICE
CERTIFICATE OF CORRECTION

| | |
|---|---|
| PATENT NO. | : 11,474,598 B2 |
| APPLICATION NO. | : 17/158642 |
| DATED | : October 18, 2022 |
| INVENTOR(S) | : Vijaya Krishna Mulpuri et al. |

It is certified that error appears in the above-identified patent and that said Letters Patent is hereby corrected as shown below:

In the Specification

Column 12, Line 33 the equation should read:
$P_{default}(Gaze_i) = 1 / (M * N)$ or simply:

Column 16, Line 8:
$\vec{y} = \alpha(W\vec{x} + \vec{b})$, where x is an input vector, $\vec{y}$ is an output
Should read:
$\vec{y} = \alpha(W\vec{x} + \vec{b})$, where $\vec{x}$ is an input vector, $\vec{y}$ is an output Signed and Sealed this
Nineteenth Day of November, 2024

Katherine Kelly Vidal
*Director of the United States Patent and Trademark Office*